(12) United States Patent
Nakamura et al.

(10) Patent No.: US 7,140,798 B2
(45) Date of Patent: Nov. 28, 2006

(54) COATING FLUID AND FLUID APPLICATOR

(75) Inventors: Hitoshi Nakamura, Fujioka (JP);
 Kyoko Kobayashi, Fujioka (JP);
 Makoto Ono, Fujioka (JP); Kei Omoto, Fujioka (JP); Tamotsu Eguchi, Fujioka (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 11/357,108

(22) Filed: Feb. 21, 2006

(65) Prior Publication Data

US 2006/0188321 A1 Aug. 24, 2006

Related U.S. Application Data

(63) Continuation of application No. PCT/JP2004/011694, filed on Aug. 13, 2004.

(30) Foreign Application Priority Data

Aug. 19, 2003 (JP) ............... 2003-295270
Aug. 20, 2003 (JP) ............... 2003-296525
Aug. 20, 2003 (JP) ............... 2003-296527

(51) Int. Cl.
 *B43K 7/00* (2006.01)
 *B43K 7/10* (2006.01)
 *C09D 11/00* (2006.01)
 *C08K 3/10* (2006.01)

(52) U.S. Cl. ............... 401/209; 401/213; 401/214; 401/188 A; 523/161; 524/413; 524/474; 106/31.13

(58) Field of Classification Search ............ 401/188 R, 401/188 A, 209, 213, 214; 523/161; 524/413, 524/474, 476, 484, 604; 106/31.13, 31.57, 106/31.58, 31.59, 31.85, 31.89
See application file for complete search history.

(56) References Cited

U.S. PATENT DOCUMENTS

| 6,491,466 | B1 | 12/2002 | Eguchi et al. |
| 6,528,068 | B1 | 3/2003 | Yumioka et al. |
| 6,596,519 | B1 * | 7/2003 | Takayanagi et al. ........ 435/134 |
| 6,936,657 | B1 * | 8/2005 | Takao et al. ................ 524/588 |
| 6,945,726 | B1 * | 9/2005 | Ichikawa et al. ........... 401/213 |

FOREIGN PATENT DOCUMENTS

JP 52-68102 6/1977

(Continued)

*Primary Examiner*—David J. Walczak
(74) *Attorney, Agent, or Firm*—Buchanan Ingersoll & Rooney PC

(57) ABSTRACT

In order to inhibit titanium oxide from settling down over a long period of time and secure a leveling property of a coating fluid including an ink composition, provided is a coating fluid for a fluid applicator, comprising at least titanium oxide, a resin and an organic solvent, wherein an additive comprising an N-acylamino acid derivative whose fundamental frame is at least one selected from N-acylamino acid amides and N-acylamino acid esters is added in an amount of 0.6 to 4.5% by weight based on the total amount of the ink composition, and a content of the resin described above is 1.5 to 11 parts by weight based on a content of 1 part by weight of the additive described above.

17 Claims, 9 Drawing Sheets

FOREIGN PATENT DOCUMENTS

| | | |
|---|---|---|
| JP | 57-202360 A | 12/1982 |
| JP | 2-235641 A | 9/1990 |
| JP | 7-222950 A | 8/1995 |
| JP | 8-58292 A | 3/1996 |
| JP | 8-118896 A | 5/1996 |
| JP | 9-53034 A | 2/1997 |
| JP | 2000-7942 A | 1/2000 |
| JP | 2000-343875 A | 12/2000 |
| JP | 2000-343879 A | 12/2000 |
| JP | 2002-256178 A | 9/2002 |
| JP | 2003-213162 A | 7/2003 |
| JP | 2004-143292 A | 5/2004 |
| JP | 2004-262200 A | 9/2004 |
| JP | 2004-276336 A | 10/2004 |

* cited by examiner

COATING FLUID AND FLUID APPLICATOR

TECHNICAL FIELD

The present invention relates to a coating fluid having a shear thinning property, specifically to a coating fluid comprising an organic solvent as a principal component which is used for writing instruments including felt-tip pens and ballpoint pens, correction devices, adhesives and toilet tools, and also a coating fluid which can well use for coating work from immediately after starting use without causing dry-up even if it is exposed to the air over a long period of time with the cap off and which is excellent in a cap-off performance and suited to writing instruments, correction devices, adhesive applicators and toilet tools, and a fluid applicator for the same.

BACKGROUND ART

In general, an ink composition containing titanium oxide has the problem that it has a high specific gravity and therefore settles down and separates with the passage of time. Accordingly, a means in which the ink composition is sufficiently stirred again before use and then used or a means in which the ink composition is provided with a shear thinning property to inhibit titanium oxide from settling down has so far been taken.

It has so far been known as the above means for providing an ink composition with a shear thinning property to add a thickener and a gelatinizing agent thereto. Materials having various chemical structures have so far been investigated for the above additives. However, it is the existing situation that materials investigated for ink compositions (so-called oil-based ink compositions) comprising organic solvents as principal components are few as compared with materials added to ink compositions (so-called water-based ink compositions) comprising water as a principal component.

Known as a thickener and a gelatinizing agent which are added to oil-based ink compositions are, for example, montmorillonite base clay minerals, fluorinated phlogopite, dextrin fatty acid esters, fatty acid amides and aluminum 2-ethylhexanoate.

Addition of the above materials to the intended ink compositions has made it possible to inhibit to the utmost a hard cake from being formed by settling of titanium oxide up to about 2 months. However, there has been the problem that when stored over a long period of 2 months or longer, a settling layer is gradually formed at the bottom of the ink. Further, a gel structure has strongly been formed in the whole part or a part of the ink compositions with the passage of standing time, and reduction in fluidity and a leveling property of the ink compositions following reduction in a shear thinning property has been brought about. On the other hand, considering that the ink composition is provided to the market in the form of a product, it is a matter of course that the quality is required to be maintained over a longer period than 2 months. Accordingly, a coating fluid in which a quality is maintained over a longer period is desired to be provided.

A material which is an additive investigated in the present invention and which comprises an N-acylamino acid derivative whose fundamental frame is at least one selected from N-acylamino acid amides and N-acylamino acid esters is also known as an oil gelatinizing agent (refer to, for example, patent document 1). Known as an ink composition containing an additive having such characteristic are, for example, one in which 0.5% by weight of N-lauroyl-L-glutamic acid-$\alpha,\gamma$-di-n-butylamide is added (refer to, for example, patent documents 2 and 3), one in which 5% by weight of N-lauroyl-L-glutamic acid-$\alpha,\gamma$-di-n-butylamide is added (refer to, for example, patent document 4) and one in which 1 to 10% by weight thereof is added (refer to, for example, patent document 5).

As described in patent document 1 described above, however, these additives are scarcely soluble in organic solvents, and therefore a specific means in which inorganic metal salts are allowed to coexist as a solubilizing agent is required. Further, it is known that these additives have a strong oil coagulant function and form a three-dimensional network in a state of enclosing oil in an individual net, so that gel which is short of fluidity is formed.

Further, as described in patent documents 2 and 3 described above, marked reduction in the fluidity is not observed in an ink composition containing 0.5% by weight of the gelatinizing agent because of a small content of the gelatinizing agent, and the writing characteristic is good. However, there has been the problem that titanium oxide can not be inhibited from settling down over a long period of 2 months or more to cause settling and separation as time passes. In an ink composition in which 5% by weight or more of the gelatinizing agent is added, a net work structure of gel is sufficiently formed because of a large amount of the gelatinizing agent, and titanium oxide can be inhibited from settling down over a long period of 2 months or more. However, fluidity of the ink composition is a little short due to the strong net work structure of the gel, and the gel becomes further firm as time passes, so that observed is the problem that reduction in fluidity and a leveling property of the ink composition is brought about to a large extent.

On the other hand, also in the ink composition in which the gelatinizing agent is suitably added, as described in patent document 5 described above, in a range of 1 to 10% by weight, particularly in a range of 1% by weight or more and less than 5% by weight, brought about to not small extent is either of the problems that settling of titanium oxide is caused when time of 2 months or longer passes or that the gel becomes firm to cause reduction in fluidity and a leveling property of the ink composition, and it is the existing situation that both problems (first problem) do not result in being solved at the same time.

Further, it has so far been known that an organic solvent having a relatively high volatility is used for a coating fluid in a fluid applicator such as a writing instrument, a correction device, an adhesive and a toilet tool for the purpose of quickly drying the coating fluid when it is coated. However, organic solvents used for paint markers and correction devices have a high volatilizing rate, and therefore caps have to be put thereon in non-use to prevent the coating fluids from drying. Accordingly, involved therein are the problems (second problem) that a labor for removing the caps in every use is required and that if the caps are neglected to be put on after use, the coating fluids are dried and solidified for a short time, so that the applicators can not be used.

On the other hand, known are a lot of correction devices of a ballpoint pen type equipped with a means in which a ball made of metal is pressed against a point aperture part, for example, by a pressing means such as a spring to seal it (refer to, for example, patent documents 6 and 7 filed by the present applicant).

On the other hand, a lot of ink compositions for marking pens which are prevented from drying up by adding a cap-off performance-improving agent such as lecithin to a coating fluid have so far been known, but if a cap-off performance-improving agent such as lecithin is used for a coating fluid containing titanium oxide which is liable to settle down, coagulating and settling down of titanium oxides themselves caused by breakage of a dispersion system and subsequent separation of the liquid are brought about in a certain case, and therefore it is the existing situation that cap-off performance-improving agents used for ink compositions for writing instruments can not simply be diverted. Further, the present applicants have filed a correction liquid-blended composition characterized by adding at least paraffin waxes as a cap-off performance-improving agent (refer to, for exampled, a patent document 8).

However, in the art described in the patent documents 6 and 7 described above, it is impossible to completely seal a tip part because of contact of metal with metal in which a metal ball is pressed against an aperture part, and the problem (third problem) that a cap is always put on in non-use is not solved.

Further, the art described in the patent document 8 described above is a correction liquid composition having an excellent cap-off performance which has not so far been available. However, if an addition amount of paraffin wax is small, a period in which the cap-off performance can be maintained is about 2 weeks, and on the other hand, a period in which the cap-off performance can be maintained is extended to one month or longer by increasing an addition amount of paraffin wax. In the product, however, a quality has to be maintained for a long period of several months or longer, and therefore it is the existing situation that the product can not help being equipped with a cap even when the art described above is used.

Further, in a gel ink ballpoint pen for correction which is a fluid applicator, a fluid reservoir filled with a correction liquid (fluid) has so far been desired to be so-called refillable because of an environmental problem. In such case, a ball point has to be protected in transporting and storing a refill alone, and a solvent has to be inhibited from being volatilized from the point.

In order to prevent such volatilization, countermeasures such as making parts constituting a fluid reservoir main body of metal or resins and providing a tip point with a seal by a resin coating film have been taken.

Many arts regarding the above fluid reservoir in which a tip point is sealed by a resin coating film have so far been proposed, and known are, for example, a resin coating film formed from a synthetic resin emulsion (refer to, for exampled, patent document 9), a resin coating film formed from a molten thermoplastic resin (refer to, for exampled, patent document 10), a resin coating film formed from a polymer latex (refer to, for exampled, patent document 11), a resin coating film formed from a hot melt resin (refer to, for exampled, patent document 12) and a colored resin coating film (refer to, for exampled, patent document 13).

The seals formed by the resin coating films described in patent documents 9 to 11 and 13 described above prevent solvents having no high volatility and water contained in water-based inks and water-based gel inks having a shear thinning property from vaporizing from tip point parts (writing point parts). In the cases of applicators filled with fluids containing solvents having high volatility such as n-hexane, cyclohexane and methylcyclohexane, the solvents are still insufficiently inhibited from vaporizing even if resin coating films of synthetic resin emulsions and polymer latexes are formed, and therefore involved therein is the problem (fourth problem) that the fluids are liable to be solidified at the sealed parts due to dry-up so that the fluids can not discharge from the tips when long time passes from production through use.

Also, the seal prepared by the resin coating film described in patent document 12 described above is formed by coating a tip point of an applicator filled with a coating liquid having a high viscosity such as a correction liquid, a toilet liquid, an adhesive and a paint with a hot melt resin such as an ethylene-vinyl acetate base resin, a polyester base resin, a polyamide base resin, a polyolefin base resin and a rubber base resin, which are comprehensive resin names, and it shows an art close to that of the present invention. However, careful investigation of the above patent document 12 shows that the examples are not described and that the specific kinds of the solvents and the specific names of the hot melt resins are not described.

In particular, in the cases of applicators filled with fluids containing solvents having high volatility such as n-hexane, cyclohexane and methylcyclohexane, the solvents are still insufficiently inhibited from vaporizing even by resin coating films of ethylene-vinyl acetate base resins and polyamide base resins, and therefore involved therein is, as is the case with the fluid applicator for a water-based ink described above, the problem (fifth problem) that the fluids are liable to be solidified at the sealed parts due to dry-up so that the fluids can not discharge from the tips when long time passes from production through use.

Patent document 1: Japanese Patent Application Laid-Open No. 68102/1977 (examples and others)

Patent document 2: Japanese Patent Application Laid-Open No. 343875/2000 (examples and others)

Patent document 3: Japanese Patent Application Laid-Open No. 343879/2000 (examples and others)

Patent document 4: Japanese Patent Application Laid-Open No. 53034/1997 (examples and others)

Patent document 5: Japanese Patent Application Laid-Open No. 256178/2002 (examples and others)

Patent document 6: Japanese Patent Application Laid-Open No. 58292/1996 (claims, examples and others)

Patent document 7: Japanese Patent Application Laid-Open No. 118896/1996 (claims, examples and others)

Patent document 8: Japanese Patent Application Laid-Open No. 213162/2003 (claims, examples and others)

Patent document 9: Japanese Patent Application Laid-Open No. 96597/1983 (claims and others)

Patent document 10: Japanese Patent Application Laid-Open No. 35294/1986 (claims, examples and others)

Patent document 11: Japanese Patent Application Laid-Open No. 98396/1982 (claims, examples and others)

Patent document 12: Japanese Patent Application Laid-Open No. 222950/1995 (claims, examples and others)

Patent document 13: Utility Model Registration No. 3076019 (claims, examples and others)

DISCLOSURE OF THE INVENTION

Problems to be Solved by the Invention

In light of the respective conventional problems and the existing situations each described above, the present invention intends to solve them. A first object thereof regarding the first problem described above is to provide a coating fluid in which titanium oxide is inhibited from settling down even over a long period of 2 months or longer and in which fluidity and a leveling property of an ink composition are secured. Also, a second object thereof regarding the second and third problems described above is to provide a coating fluid and a fluid applicator in which the coating fluid can discharge well from a point immediately after starting use without causing dry-up even after exposed to the air with the cap off over a long period of time and which is excellent in a cap-off performance. Further, a third object thereof regarding the fourth and fifth problems described above is to provide a fluid applicator equipped with a coating fluid reservoir of a refill type filled with a coating fluid containing a solvent having high volatility, in which the solvent is surely inhibited from volatilizing from a tip point and which is refillable and capless.

Means for Solving the Problems

Intensive investigations repeated by the present inventors regarding the respective problems of the conventional arts described above have resulted in finding that the coating fluid of the first object (the first invention) is obtained by an ink composition comprising at least titanium oxide, a resin and an organic solvent, wherein an additive comprising an N-acylamino acid derivative whose fundamental frame is at least one selected from N-acylamino acid amides and N-acylamino acid esters is added in an amount falling in a specific range based on the total amount of the ink composition, and a content of the resin described above is allowed to fall in a specific range per 1 part by weight of a content of the additive described above. Also the inventors have found that the coating fluid and the fluid applicator of the second object (the second present invention) which are excellent in a cap-off performance are obtained by a fluid applicator equipped with a tip of a ballpoint pen and a coating fluid reservoir storing a coating fluid at a rear part, wherein a part of a tip ball protrudes from an aperture part; a spring pressure is applied onto the back face of the ball described above so that the aperture part described above can airtightly be closed; a moving distance (clearance) of the tip ball described above toward a rear part is set to 0.06 to 0.2 mm; an organic solvent having specific physical properties is used for the coating fluid, and a resin having specific physical properties is added in specific amount. Further, the inventors have found that the fluid applicator of the third object (the third present invention) is obtained by a fluid applicator which is filled with a coating fluid such as a correction liquid and an oil-based ink comprising at least an organic solvent, a colorant and a resin and having a shear thinning property and in which a tip point part is sealed by a resin coating film formed from a hot melt adhesive, wherein a resin coating film having specific physical properties is used as the resin coating film, and pulling strength thereof in peeling is allowed to fall in a specific range. Thus, the present inventions (first invention to third invention) have come to be completed.

That is, the present inventions comprise the following items (1) to (15).

(1) A coating fluid characterized by that in an ink composition comprising at least titanium oxide, a resin and an organic solvent, an additive comprising an N-acylamino acid derivative whose fundamental frame is at least one selected from N-acylamino acid amides and N-acylamino acid esters is added in an amount of 0.6 to 4.5% by weight based on the total amount of the ink composition and that a content of the resin described above is 1.5 to 11 parts by weight based on a content of 1 part by weight of the additive described above.

(2) The coating fluid as described in the above item (1), wherein the additive described above is N-lauroyl-L-glutamic acid-α,γ-di-n-butylamide.

(3) The coating fluid as described in the above item (1) or (2), wherein the resin described above is an acryl base resin and has a number average molecular weight of 10000 to 200000.

(4) The coating fluid as described in any one of the above items (1) to (3), wherein the acryl base resin described above is an acryl base synthetic resin which is obtained by copolymerizing monomers comprising a (meth)acrylic acid ester represented by the following Formula (I) in a range of 93 to 99% by weight and a basic nitrogen-containing monomer represented by the following Formula (II) in a range of 0.4% by weight or more and less than 2% by weight:

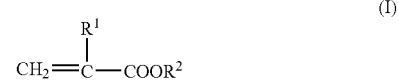

(I)

[in Formula (I) described above, R1 represents a hydrogen atom or a methyl group, and R2 represents a linear or ranched hydrocarbon group having 1 to 18 carbon atoms or a hydrocarbon group having a naphthene ring or an aromatic ring];

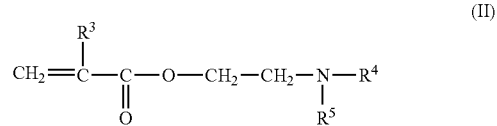

(II)

[in Formula (II) described above, R3 represents a hydrogen atom or a methyl group, and R4 and R5 each represent independently a methyl or ethyl group].

(5) A fluid applicator which is equipped with a ballpoint pen tip at a point and an ink reservoir at a rear and in which a spring pressure is applied onto a back face of a point ball so that the point ball is brought into tight contact with an inner edge of a ball holding part at a point of the tip, wherein the ink reservoir described above is filled with the coating fluid as described in any one of above items (1) to (4).

(6) A coating fluid used for a fluid applicator which is equipped with a ballpoint pen tip at a point and a coating fluid reservoir for storing the coating fluid at a rear, the tip of which comprises a tip main body having a ball receiving chamber for allowing the coating fluid to flow in and having a front end aperture part for discharging the coating fluid at a point part of the ball receiving chamber, a ball received in the ball receiving chamber in the above tip main body, partially protruding from the front end aperture part described above and airtightly closing the aperture part, a spring applying pressure on the back face of the above ball to support it from a rear and a ball receiving seat controlling a moving distance of the ball toward a rear and in which the moving distance of the ball toward the rear is 0.06 to 0.2 mm, wherein the above coating fluid comprises at least titanium oxide, a resin and an organic solvent; the organic solvent comprises an organic solvent which has a vapor pressure of 1 mm Hg or more at 20° C. and a low polarity corresponding to a solubility parameter δ of 10 or less and which has relatively high volatility; and the resin has a glass transition temperature (Tg) of 100° C. or lower and is contained in an amount of 9.7 to 22% by weight based on the total amount of the coating fluid.

(7) The coating fluid as described in the above item (6), wherein the resin is an acryl base resin, and it is an acryl base synthetic resin which is obtained by copolymerising monomers comprising a (meth)acrylic acid ester represented by the following Formula (I) in a range of 93 to 99% by weight and a basic nitrogen-containing monomer represented by the following Formula (II) in a range of 0.4% by weight or more and less than 2% by weight:

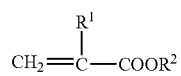

(I)

[in Formula (I) described above, R1 represents a hydrogen atom or a methyl group, and R2 represents a linear or branched hydrocarbon group having 1 to 18 carbon atoms or a hydrocarbon group having a naphthene ring or an aromatic ring];

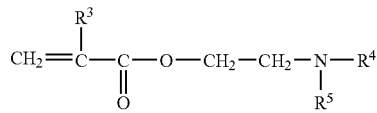

(II)

[in Formula (II) described above, R3 represents a hydrogen atom or a methyl group, and R4 and R5 each represent independently a methyl or ethyl group].

(8) A fluid applicator which is equipped with a ballpoint pen tip at a point and a coating fluid reservoir for storing a coating fluid at a rear, the tip of which comprises a tip main body having a ball receiving chamber for allowing the coating fluid to flow in and having a front end aperture part for discharging the coating fluid at a point part of the ball receiving chamber, a ball received in the ball receiving chamber in the above tip main body, partially protruding from the front end aperture part described above and airtightly closing the aperture part, a spring applying pressure on the back face of the above ball to support the ball from a rear and a ball receiving seat controlling a moving distance of the ball toward a rear and in which the moving distance of the ball toward the rear is 0.06 to 0.2 mm, wherein the above coating fluid comprises at least titanium oxide, a resin and an organic solvent; the organic solvent comprises an organic solvent which has a vapor pressure of 1 mm Hg or more at 20° C. and a low polarity corresponding to a solubility parameter 6 of 10 or less and which has relatively high volatility; and the resin has a glass transition temperature (Tg) of 100° C. or lower and is contained in an amount of 9.7 to 22% by weight based on the total amount of the coating fluid.

(9) The fluid applicator as described in the above item (8), wherein a load of the spring pressing the point ball which is applied on the back face of the point ball is 0.1 to 1.5N.

(10) The fluid applicator as described in the above item (8) or (9), wherein the coating fluid reservoir main body or the reat thereof is equipped with a pressing means or a pressurizing mechanism so that the coating fluid filled in the coating fluid reservoir can be pressurized and coated.

(11) A fluid applicator which is equipped with a coating fluid reservoir mounted in a barrel main body, in which the coating fluid reservoir is filled with a coating fluid containing at least an organic solvent selected from the following A group and a colorant and having a shear thinning property, which is equipped with a ballpoint pen tip having a discharge-controlling mechanism at a point and in which a point part of the above tip is sealed with a resin coating film formed from a hot melt adhesive, wherein the resin coating film is a coating film formed from polymerized fatty acid-modified polyamide represented by the following Formula (III), and the above coating film has a pulling strength of 1 to 10N under the condition of 25° C. and 60 RH % measured by means of a push-pull tester;

A group: n-hexane, n-heptane, n-octane, isooctane, cyclohexane, methylcyclohexane, ethylcyclohexane, toluene and xylene:

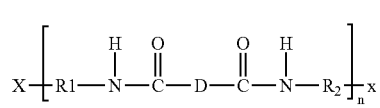

(III)

[in Formula (III) described above, D is a dimer acid frame; X is a terminal group such as —COOH, —NH$_2$ and —H; R1 and R2 are amine frames; and n is a positive number].

(12) The fluid applicator as described in the above item (11), wherein the resin coating film is formed so that D1<D2 is achieved in a thickness of a part sealed by the resin coating film at a point part of the ballpoint pen tip, wherein D1 is a maximum thickness of the coating film seal on the ball part, and D2 is a minimum thickness of the seal on the tip part.

(13) The fluid applicator as described in the above item (11) or (12), wherein the shape of the seal formed from the resin coating film is any one of a droplet form, a reverse hanging bell form and a conical form.

(14) The fluid applicator as described in any one of above items (11) to (13), wherein it is a capless type of a knock type in which a ballpoint pen tip point part constituting a pen tip can be come out and in interlocking with a push-out operation and a releasing operation of a knock mechanism provided at a rear end of the barrel main body.

(15) The fluid applicator as described in any one of above items (11) to (14), wherein the fluid reservoir is receivable in the barrel main body having a pressuring mechanism.

EFFECTS OF THE INVENTION

According to the first invention, provided are a coating fluid in which titanium oxide is inhibited from settling down even for a long period of 2 months or longer, in which fluidity and a leveling property are secured, which is used for writing instruments including felt-tip pens and ballpoint pens, correction devices, adhesives and toilet tools and which has a shear thinning property and a fluid applicator using the same.

According to the second invention, provided are a coating fluid which can discharge well from a tip immediately after starting use without causing dry-up even after exposed to the air with a cap off over a long period of time and which is excellent in a cap off performance and a fluid applicator.

According to the third invention, provided is a fluid applicator in which a solvent having high volatility is surely inhibited from being volatilized from a tip point and in which a tip point part is surely protected, and which is refillable and capless.

BRIEF DESCRIPTIONS OF THE DRAWINGS

EXPLANATION OF CODES

Figure 1:
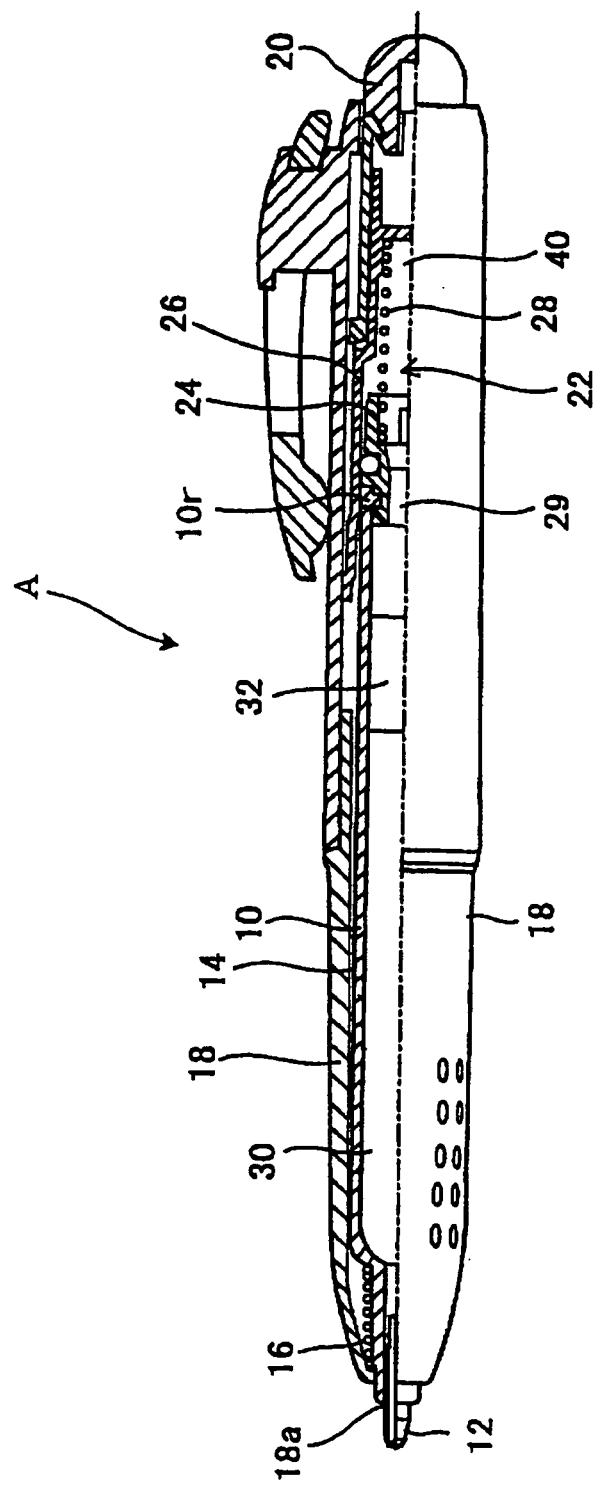
FIG. 1 is a partial vertical drawing showing one example of use state of the fluid applicator of the first invention.

A fluid applicator
H resin coating film
10 coating fluid reservoir
12 ballpoint pen tip
30 coating fluid
32 follower

BEST MODE FOR CARRYING OUT THE INVENTION

The embodiments of the present invention (the first invention to the third invention) shall be explained below in details one by one.

The coating fluid of the first invention is characterized by that in an ink composition comprising at least titanium oxide, a resin and an organic solvent, an additive comprising an N-acylamino acid derivative whose fundamental frame is at least one selected from N-acylamino acid amides and N-acylamino acid esters is added in an amount of 0.6 to 4.5% by weight based on the total amount of the ink composition and that a content of the resin described above is 1.5 to 11 parts by weight based on 1 part by weight of the additive.

The additive used in the first invention is an additive comprising an N-acylamino acid derivative whose fundamental frame is at least one selected from N-acylamino acid amides and N-acylamino acid esters, and ink composition is provided with a shear thinning property by adding the additive to the ink composition. The specific additive includes N-oleylglycine-n-octylamide, N-cocoylalaninecyclohexylamide, N-lauroylvaline-n-butylamide, N-hardened beef fatty acid acyloicineamide, N-palmitoyl-E-aminocaproic acid ethylamide, N-palmitoylmethioninestearyamide, N-decanoylphenylalanineoleylamide, N-myristoylaspartic acid-α, β-diethanolamide, N-acetylglutamic acid-α,γ-dilaurylamide, $N^{\alpha},N^{\epsilon}$-dicapriloyllysinedimethylamide, $N^{\alpha},N^{\epsilon}$-dicapriloyllysineisostearyl ester, $N^{\alpha},N^{\epsilon}$-dilauroyllysineoctyl ester, $N^{\alpha},N^{\delta}$-dicapriloylornithinelauryl ester, $N^{\alpha},N^{\delta}$-dicapriloylornithineoleyl ester, N-myristoylisoleucineethylamide, N-decanoylthreonineoctylamide, N-stearoylseinepropylamide, N-butyrylglutamic acid-α,γ-dioctylamide, N-palmitoyl-β-alanyloctylamide, N-lauroylglutamic acid-α,γ-diethylamide, N-lauroyl-L-glutamic acid-α,γ-di-n-butylamide, $N^{\alpha},N^{\epsilon}$-dilauroyllysinediethylamide, $N^{\alpha},N^{\epsilon}$-didecanoylornithinemyristyl ester, N-2-ethylhexanoylaspartic acid-α,β-dioctylamide and stearoylornithineoleyl ester. The above additives may be used alone or in combination of two or more kinds thereof. N-lauroyl-L-glutamic acid-α,γ-di-n-butylamide is preferably used in terms of gelatinizing various kinds of the organic solvents. When used as the additive are compounds which provides a shear thinning property but it does not comprise an N-acylamino acid derivative whose fundamental frame is at least one selected from N-acylamino acid amides and N-acylamino acid esters, for example, synthetic smectite, 12-hydroxystearic acid and the like, the effects of the present invention are not exhibited.

A content of the additives described above has to be an amount required not only for providing the ink with a shear thinning property but also inhibiting titanium oxide from settling down to the utmost even for a long period of 2 months or longer and securing fluidity and a leveling property of the ink composition. The specific content has to be 0.6 to 4.5 parts by weight base on the total amount (100 parts by weight) of the ink composition, and it is selected preferably from a range of 1.5 to 3.5 parts by weight.

If the above content of the additive is less than 0.6 part by weight, a marked detrioration in the fluidity is not observed because of a small content of the gelatinizing agent, and the writing characteristic is good. However, titanium oxide can not be inhibited from settling down for a long period of 2 months or longer, and settling down and separation thereof are brought about with the passage of time. On the other hand, in the ink composition containing the additive in an amount exceeding 4.5 parts by weight, a large amount of the gelatinizing agent makes it possible to sufficiently form a network structure of the gel and inhibit titanium oxide from settling down for a long period of 2 months or longer, but the ink composition is a little poor in fluidity because of the strong network structure of the gel. In addition thereto, the gel becomes further firm with the passage of time, and fluidity and a leveling property of the ink composition are reduced to a large extent in a certain case in the passage of 2 months or longer. Accordingly, both the ranges are not preferred.

Capable of being used as the resin used in the first invention is, for example, at least one selected from acryl resins, alkid resins, alkylphenol resins, polyester resins and vinyl acetate-acryl resins. Acryl base synthetic resins are preferred, and said resins include homopolymers of (meth) acrylic acid esters, copolymers of two or more kinds of (meth)acrylic acid esters and copolymers of at least one of (meth)acrylic acid esters with styrene.

Further, the preferred resin is an acryl base synthetic resin which is obtained by copolymerizing monomers comprising a (meth)acrylic acid ester represented by the following Formula (I) in a range of 93 to 99% by weight and a basic nitrogen-containing monomer represented by the following Formula (II) in a range of 0.4% by weight or more and less than 2% by weight:

[in Formula (I) described above, R1 represents a hydrogen atom or a methyl group, and R2 represents a linear or branched hydrocarbon group having 1 to 18 carbon atoms or a hydrocarbon group having a naphthene ring or an aromatic ring];

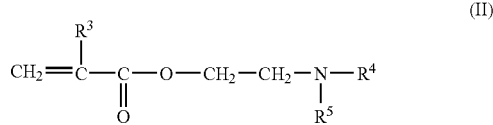

[in Formula (II) described above, R3 represents a hydrogen atom or a methyl group, and R4 and R5 each represent independently a methyl or ethyl group].

The (meth)acrylic acid ester described above includes methacrylates and acrylates such as methyl (meth)acrylate, ethyl (meth)acrylate, propyl (meth)acrylate, isopropyl (meth)acrylate, isobutyl (meth)acrylate, n-butyl (meth)acrylate, 2-ethylhexyl (meth)acrylate, octyl (meth)acrylate, lauryl (meth)acrylate, cetyl (meth)acrylate, stearyl (meth)acrylate, cyclohexyl (meth)acrylate.

The (meth)acrylic acid ester represented by Formula (I) described above has to be used in an amount of 93 to 99% by weight as a copolymer component for the acryl base resin, and if the content is less than 93% by weight, it is likely that the solubility of copolymer in organic solvents is deteriorated and that the drawn lines are fragile. On the other hand, if it exceeds 99% by weight, the dispersion stability of a pigment such as titanium oxide is deteriorated.

N,N-dimethylaminoethyl(meth)acrylate and N,N-diethylaminoethyl(meth)acrylate are used as the basic nitrogen-containing monomer represented by Formula (II).

The basic nitrogen-containing monomer represented by Formula (II) has to be used in a range of 0.4% by weight or more and less than 2% by weight as a copolymer component for the acryl base resin. If this amount is less than 0.4% by weight, an amount of the resin adsorbed on the titanium oxide pigment is small, and particularly the dispersion stability of the pigment over a long period of time tends to be deteriorated. On the other hand, if it is 2.0% by weight or more, solubility of the acryl base resin itself in an organic solvent tends to be deteriorated, and said acryl base resin vanish itself is liable to cause phase separation during storage. As a result, the resin tends to be separated from the solvent with the passage of time, and deterioration in the storage stability of a coating fluid due to inferior dispersion of the pigment (an increase in the viscosity and a settling down of the pigment) and the inferior drawn lines (peeling and cracking of drawn lines) are liable to be brought about, which are likely to cause not a little problems on the objects that titanium oxide is inhibited from settling down by a gel structure and that fluidity and a leveling property of the ink composition are secured. This originates in that the basic nitrogen-containing monomer is intrinsically a strongly hydrophilic monomer, and it is presumed that solubility of the acryl resin itself in an organic solvent is inevitably deteriorated as a content of said monomer is increased.

The acryl base synthetic resin described above which is used for the coating fluid of the first invention may be mixed, if necessary, with styrene monomer of less than 5% by weight as a copolymer component. Copolymerization with the styrene monomer makes it possible that the copolymer makes the surface layer of the drawn lines more minute and provides flexible drawn lines. However, if it exceeds 5% by weight, the copolymer is likely to deteriorate in the solubility in an organic solvent, and the drawn lines are likely to be fragile.

The acryl base synthetic resin described above which is used in the first invention is dissolved in an organic solvent and has a function as a resin for dispersing titanium oxide and other pigments suitably used, and a use amount thereof is preferably 0.9% by weight or more, more preferably 9 to 22% by weight based on the ink composition (total amount). If the content of the resin is less than 0.9% by weight, inferior dispersion of the pigment is caused, and the drawn lines are very fragile. On the other hand, if it exceeds 22% by weight, skinning is brought about on the surface of the drawn lines, and the solvent contained in the drawn lines is less liable to be volatilized, which results in deteriorating drying of the drawn lines.

Also, the acryl base synthetic resin described above which is used in the first invention is compatible with the additive comprising the N-acylamino acid derivative of at least one selected from N-acylamino acid amides and N-acylamino acid esters to form a preferred three-dimensional network structure which exhibits the effects of the present invention. In respect to the use amount for forming the three-dimensional network structure, a content of the resin has to be 1.5 to 11 parts by weight based on 1 part by weight of the additive in the ink composition (total amount), and it is preferably 3 to 9.5 parts by weight. If the amount is less than 1.5 part by weight, the network structure in which the additive is predominant is formed, so that a function close to that of an oil coagulant which is peculiar to the additive is strongly exerted, and gel which is poor in fluidity is formed. Accordingly, it is not preferred. On the other hand, if it exceeds 11 parts by weight, the resin component is predominant in the three-dimensional network structure formed, and fluidity of the ink composition is maintained. However, strength of the gel structure in a still standing state is reduced, and a function of inhibiting the pigment from settling down which is the original object can not be exhibited as time passes. Accordingly, it is not preferred.

The acryl base resin described above which is used in the first invention can be produced by a solution polymerization process which has so far been publicly known. Matters worth of being specially described are that the acryl base resin preferably used in the present invention has a number average molecular weight (Mn) of 10000 to 200000 and that a content thereof is controlled to 1.5 to 11 parts by weight, preferably 3 to 9.5 parts by weight based on 1 part by weight of the additive comprising the N-acylamino acid derivative of at least one selected from N-acylamino acid amides and N-acylamino acid esters, whereby a syneresis problem caused after forming a gel structure (it is a phenomenon in which a part of a dispersion medium contained in the pores of the gel structure is released due to shrink of the gel structure in a step of ripening thereof, and a translucent or transparent liquid comes out of a gel ink composition) can be mitigated to a large extent. The more preferred acryl base resin has a number average molecular weight (Mn) of 20000 to 50000, and the resin having a number average molecular weight falling in the above range exhibits the effects of the present invention.

If the acryl base resin has a number average molecular weight (Mn) of less than 10000 and a content of less than 1.5 part by weight based on 1 part by weight of the additive comprising the N-acylamino acid derivative of at least one selected from N-acylamino acid amides and N-acylamino acid esters, the gel structure can not be inhibited from shrinking as the gel structure is ripened. On the other hand, if the acryl base resin has a molecular weight of exceeding 200000 and a content of exceeding 11 parts by weight based on 1 part by weight of the additive comprising the N-acylamino acid derivative of at least one selected from N-acylamino acid amides and N-acylamino acid esters, the gel structure can be inhibited from shrinking as the gel structure is ripened, but the whole of the gel structure is reduced in strength because a physical steric hindrance of the acryl base resin is exerted on the gel structure. This makes it impossible to inhibit the pigment from settling down, which results in generating a supernatant to produce a translucent or transparent liquid which looks like generation of syneresis, and therefore it is not preferred.

Titanium oxide used in the first invention includes titanium dioxides of a rutile type and an anatase type. Commercially available products of usable titanium dioxide include TITANIX JR-301, ditto JR-701, ditto JR-600 and ditto JR-801 (all manufactured by Tayca Corporation), Tipure R-900, ditto R-931 and ditto R-960 (all manufactured by Du Pont Co., Ltd.), TITONE SR-1, ditto KA-10 and ditto KA-20 (all manufactured by Sakai Chemical Industry Co., Ltd.), Kronos KR-310, ditto KR-380, ditto KR-380N and ditto KR-460 (all manufactured by Titan Kogyo KABUSHIKI KAISHA) and R-780, R-820, CR-50 and CR-93 (all manufactured by Ishihara Sangyo Co., Ltd.).

A content of titanium dioxide based on the ink composition (total amount) falls in a range of 5 to 60% by weight, preferably 10 to 50% by weight depending on the use purposes of the gel ink composition. If the content of titanium dioxide is less than 5% by weight, a masking property of titanium dioxide is not exhibited at all. On the other hand, if it exceeds 60% by weight, the gel structure has to be stronger in order to make all titanium dioxide less liable to settle down, which results in being unable to secure fluidity of the ink. A particle size of titanium dioxide which can be used shall by no means be restricted.

The organic solvent used in the first invention shall by no means be restricted as long as it is usually used for writing instruments, correction devices, adhesives and toilet tools. The organic solvent which can specifically be used includes at least one selected from non-polar aliphatic hydrocarbons and naphthene base hydrocarbons such as n-hexane, isohexane, n-heptane, n-octane, isooctane, cyclohexane, methylcyclohexane and ethylcyclohexane, aromatic hydrocarbons such as toluene and xylene and halogenated hydrocarbons such as 1,1,2-trichloroethane and tetrachloromethane.

In terms of drying time of the coating film having a good masking property and controlling of the viscosity, it includes preferably organic solvents which have a vapor pressure of 1 mm Hg or more at 20° C. and a low polarity corresponding to a solubility parameter δ of 10 or less and which have relatively high volatility, and to be specific, it includes at least one selected from n-hexane, isohexane, n-heptane, n-octane, isooctane, cyclohexane, methylcyclohexane, ethylcyclohexane, toluene and xylene.

A content of the organic solvents is 20 to 80% by weight, preferably 35 to 60% by weight based on the total amount of the ink composition. However, it is likely to be difficult to dissolve the additive comprising the N-acylamino acid derivative of at least one selected from N-acylamino acid amides and N-acylamino acid esters and other resins depending on the kind of the organic solvents, and they are likely to be unable to readily be used for the gel ink composition. However, the additives and the other resins which are used in the present invention can be dissolved by heating. If the dissolving temperatures of the additives and resin are higher than a boiling point of the organic solvent used, they can be dissolved by temporarily elevating a boiling point of the organic solvent up to the dissolving temperatures of the additives and resin under pressurized environment. Also, the additives and resin can be dissolved or dispersed by means of a ball mill or bead mill.

In the first invention, titanium oxide, the resin, the organic solvent and the additive comprising the N-acylamino acid derivative whose fundamental frame is at least one selected from N-acylamino acid amides and N-acylamino acid esters are essential components, and in addition to the respective components, a coloring material such as a dye, a dispersant used for dispersion stability of titanium oxide used as a masking agent and other various additives (optional components) can suitably be added according to the uses of the coating fluid such as a writing instrument, a correction device, an adhesive and a toilet tool as long as the effects of the first invention are not damaged. In the present invention, a viscosity of the coating fluid is suitably set up according to the uses in the range of the blend formulation described above, and the viscosity when the coating fluid of the first invention is used, for example, for a correction liquid has preferably a structural viscosity of 250 mPa·s or less at a shearing speed of 400 s$^{-1}$ and 1000 mPa·s or more at a shearing speed of 5 s$^{-1}$ at 25° C.

The oil-based ink composition of the first invention can suitably be used for a fluid applicator such as a writing instrument including a felt-tip pen and a ballpoint pen, a correction device, an adhesive applicator and a toilet tool.

In the first invention thus constituted, a content of the additive comprising the N-acylamino acid derivative of at least one selected from N-acylamino acid amides and N-acylamino acid esters is controlled to 0.6 to 4.5% by weight based on the total amount of the ink composition, and a content of the resin is controlled to 1.5 to 11 parts by weight based on 1 part by weight of the additive described above, whereby capable of being provided is a coating fluid in which titanium oxide is inhibited from settling down even for a long period of 2 months or longer and in which fluidity and a leveling property of the ink composition are secured. Further, a syneresis phenomenon observed in a gel ink composition can be inhibited as well to a large extent.

Further, a coating fluid in which titanium oxide is further inhibited from settling down even for a long period of 3 months or longer and fluidity and a leveling property of the ink composition are further secured and in which a syneresis phenomenon observed in a coating fluid can be inhibited as well to a large extent is obtained by using N-lauroyl-L-glutamic acid-α,β-di-n-butylamide as the additive and an acryl base resin having a number average molecular weight of 10000 to 200000 as the resin described above.

The fluid applicator of the first invention is characterized by that it is equipped with a tip of a ballpoint pen at a point and an ink reservoir at a rear and a spring pressure is applied on the back face of a point ball so that the point ball is tightly brought into contact with an inner edge of a ball holding part at a point of the tip and that the ink reservoir described above is filled with the coating fluid having the constitution described above.

Figure 2:
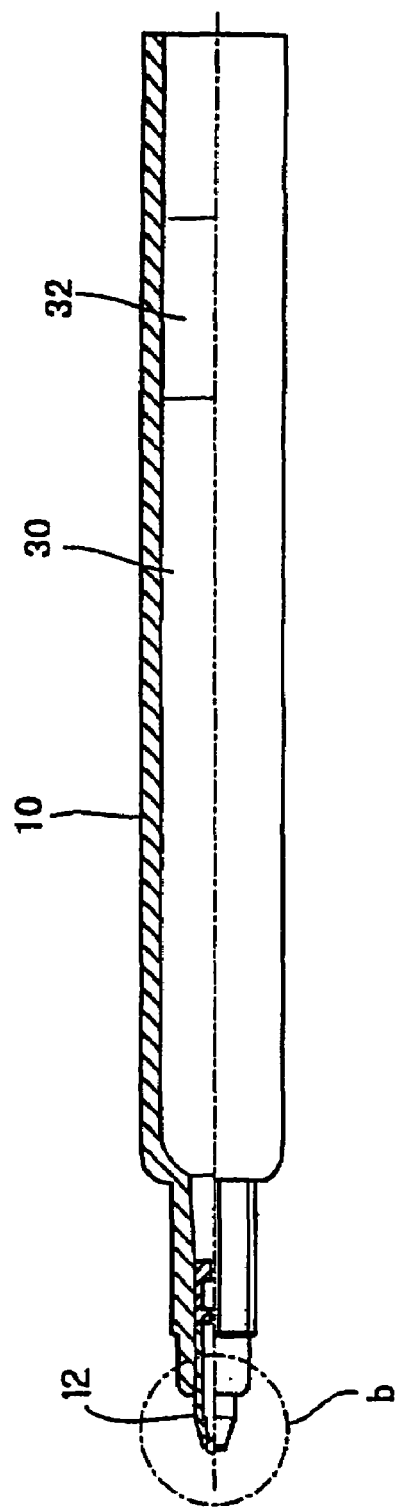
FIG. 2 is a partial vertical cross-sectional drawing showing an ink reservoir in FIG. 1.
Figure 3:
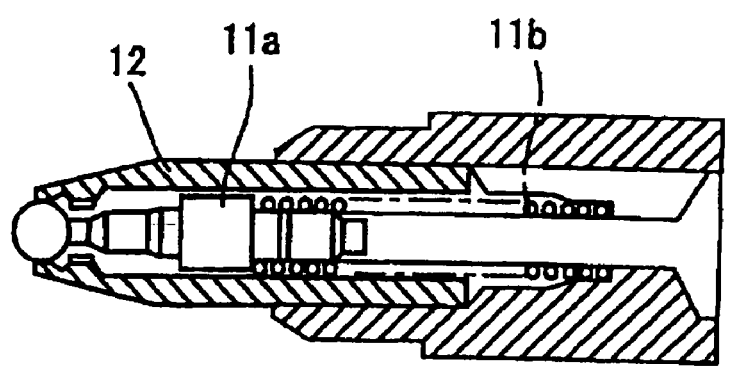
FIG. 3 is an enlarged vertical cross-sectional drawing of a coating part which is a tip part of the ink reservoir in FIG. 2.

The fluid applicator of the first present invention shall not specifically be restricted as long as it has the structure described above, and it includes, for example, a ballpoint pen type fluid applicator of a knock type equipped with a pressurizing pumping mechanism described in Japanese Patent Application Laid-Open No. 335173/2000 filed by the present applicant and a pressurizing type fluid applicator of a knock type which has the pressurizing mechanism shown in FIG. 1 to FIG. 3, and whose refill unit is detachable to a main body (correction pen).

To briefly explain the structure of the above pressurizing type fluid applicator A of a knock type shown in FIG. 1 to FIG. 3, it is a fluid applicator in which a refill unit 14 equipped with a ballpoint pen tip 12 (an example of a coating part) at a point and an ink reservoir (refill) 10 at a rear is loaded in a barrel main body 18 in the state that it is resiliently pressed toward the rear by a first spring 16 and in which the ballpoint pen tip 12 of the refill unit 14 described above can come in and out from a point aperture 18a interlocking with push-out operation and releasing operation of a knock mechanism 20 provided at a rear end of the barrel main body 18, wherein a rear part 10r of the fluid reservoir 10 of the refill unit 14 described above is opened; a pressurizing mechanism 22 for increasing a pressure of the inside of the refill 10 is provided between the rear part 10r and the knock mechanism 20 in the barrel main body 18; the pressurizing mechanism 22 has a sealing part 24, a cylinder part 26 opened at a front end and a second spring 28 for resiliently pressing them in a direction in which the sealing part 24 and the cylinder part 26 are allowed to be detached; when a point of the ballpoint pen tip 12 protruding from the barrel main body 18 by the push-out operation of the knock mechanism 20 is pressed to allow the refill unit 14 to go back, the sealing part 24 goes back in the pressurizing mechanism 22, and the cylinder part 26 relatively goes forward to compress internal air in a pressurizing chamber 40; and a check valve is opened by the compressed internal air to pressurize the inside of the refill 10 through the sealing part 24. Also, the pressurizing mechanism 22 releases a pressurizing state in the refill 10 with retreating the ballpoint pen tip 12 of the refill unit 14 into the barrel main body 18 by releasing push-out of the knock mechanism 20. Further, the refill unit 14 described above is constituted from the refill 10 filled with a coating fluid (correction liquid) 30 and a follower 32 following the coating fluid 30 at a back end thereof and the ballpoint pen tip 12 pressed into a front of the refill 10. A ball which is rotatably interfitted in the inside of the ballpoint pen tip 12 is pressed toward the front by a spring (spring pressure) 11b via a pushing bar 11a to be provided with a back pressure, and it closes a point aperture part of the ballpoint pen tip 12 in non-coating. The follower 32 is filled at a rear part of the coating fluid 30 for the purpose of preventing a solvent contained in the coating fluid 30 from volatilizing.

In the above fluid applicator, when a lot of discharge of the coating fluid is required, a point of the coating part 12 protruding from the barrel main body 18 is pressed onto a coating face, whereby the refill 10 can further be pushed into the pressurizing mechanism to be applied larger pressurizing force. As described above, pressure can be applied only in use, and therefore the coating fluid (correction liquid) can be prevented from leaking in non-use. Further, the ink reservoir (refill) 10 itself is constituted of a single layer or a composite layer of a nylon resin (polyamide), EVOH or the like having a light transmittance of 50% or more, preferably 80% or more measured based on ASTM D792. Accordingly, it is excellent in visibility and a clear drain property, and particularly a part for pressurization is not required, so that the cost of the refill can be controlled to a lower level, and a running cost for exchanging the refill can be lowered. Further, if used for the barrel main body 18 are also resins having visibility corresponding to a light transmittance of 50% or more, preferably 80% or more measured based on ASTM D792, for example, polypropylene (PP), polyethylene (EP), cyclic polyolefin, polymethylpentene, polyethylene terephthalate (PET), polybutylene terephthalate (PBT), polystyrene (PS) and polycarbonate (PC) each having a light transmittance of 80% or more, a remaining amount of the coating fluid 30 filled in the ink reservoir 10 having visibility can readily be visually observed.

The fluid applicator of the first invention thus constituted is equipped with the tip of a ballpoint pen at a point and the ink reservoir at a rear, and a spring pressure is applied on the back face of the point ball so that the point ball is tightly brought into contact with an inner edge of the ball holding part at a point of the tip. The ink reservoir described above is filled with the coating fluid having the constitution described above. Accordingly, obtained is the fluid applicator in which titanium oxide in an ink composition is inhibited from settling down even for a long period of 3 months or longer and fluidity and a leveling property of the ink composition can be secured and in which a syneresis phenomenon observed in a coating fluid can be inhibited as well to a large extent.

Next, the embodiment of the second invention shall be explained in details.

The coating fluid and the fluid applicator of the second invention is a fluid applicator which is equipped with a tip of a ballpoint pen at a point and a coating fluid reservoir for storing a coating fluid at a rear, the tip of which comprises a tip main body having a ball receiving chamber for allowing the coating fluid to flow in and having a front end aperture part for discharging the coating fluid at a point part of the ball receiving chamber, a ball received in the ball receiving chamber in the above tip main body, partially protruding from the front end aperture part described above and airtightly closing the aperture part, a spring applying pressure on the back face of the above ball to support it from a rear and a ball receiving seat controlling a moving distance of the ball toward a rear and in which the above moving distance of the ball toward the rear is 0.06 to 0.2 mm and a coating fluid used for the above fluid applicator, wherein the coating fluid comprises at least titanium oxide, a resin and an organic solvent; the organic solvent comprises an organic solvent which has a vapor pressure of 1 mm Hg or more at 20° C. and a low polarity corresponding to a solubility parameter 6 of 10 or less and which has relatively high volatility and the resin described above has a glass transition temperature (Tg) of 100° C. or lower and is contained in an amount of 9.7 to 22% by weight based on the total amount of the coating fluid.

The coating fluid of the second invention is, as described above, used for the fluid applicator having the specific tip structure described above, and it comprises at least titanium oxide, the resin and the organic solvent each having specific physical properties. The coating fluid of the present invention is used for inks for writing instruments, correction liquids, liquid adhesives, toilet liquids and liquid paints depending on uses as long as it contains the respective components described above.

Titanium oxide used for the coating fluid of the second invention includes titanium dioxide of a rutile type or an anatase type as is the case with the first invention described above. Commercially available products of usable titanium dioxide include TITANIX JR-301, ditto JR-701, ditto JR-600 and ditto JR-801 (all manufactured by Tayca Corporation), Tipure R-900, ditto R-931 and ditto R-960 (all manufactured by Du Pont Co., Ltd.), TITONE SR-1, ditto KA-10 and ditto KA-20 (all manufactured by Sakai Chemical Industry Co., Ltd.), Kronos KR-310, ditto KR-380, ditto KR-380N and ditto KR-460 (all manufactured by Titan Kogyo kabushiki kaisha) and R-780, R-820, CR-50 and CR-93 (all manufactured by Ishihara Sangyo Co., Ltd.).

A content of titanium dioxide based on the coating fluid (total amount) falls in a range of 5 to 60% by weight, preferably 10 to 50% by weight depending on the use purposes of the ink composition. If the content is less than 5% by weight, a masking property of titanium dioxide is not exhibited at all. On the other hand, if it exceeds 60% by weight, a content of titanium dioxide is too large, and the intended dry coating film is less liable to be formed. A particle size of usable titanium dioxide shall by no means be restricted.

The organic solvent used for the coating fluid of the second invention includes organic solvents which have a vapor pressure of 1 mm Hg or more at 20° C. and a low polarity corresponding to a solubility parameter 6 of 10 or less and which have relatively high volatility and it shall by no means be restricted as long as it has the above physical properties and is usually used for writing instruments, correction devices, adhesives, toilet tools and the like. The organic solvent having the physical properties which can specifically be used includes at least one selected from non-polar aliphatic hydrocarbons and naphthene base hydrocarbons such as n-hexane, isohexane, n-heptane, n-octane, isooctane, cyclohexane, methylcyclohexane and ethylcyclohexane and aromatic hydrocarbons such as toluene and xylene.

If used is an organic solvent having a vapor pressure of less than 1 mm Hg at 20° C. or a solubility parameter 5 of exceeding 10, longer time is required for volatilizing the organic solvent in many cases, and longer time is consumed for forming a drying-inhibition coating film formed from the coating fluid, so that a film thickness of the coating film is increased, and a coating film which can readily be broken by transferring of the ball toward a rear and movement caused by rotation is less liable to be obtained. Accordingly, it is not preferred.

A content of the organic solvents is 20 to 80% by weight, preferably 35 to 60% by weight based on the total amount of the coating fluid.

At least one of resins having a glass transition temperature (Tg) of 100° C. or lower, preferably 40° C. or lower selected from acryl resins, alkid resins, alkylphenol resins, polyester resins, vinyl acetate-acryl resins and maleic acid resins can be used as the resin used for the coating fluid of the second invention. If a resin having a glass transition temperature of exceeding 100° C. is used, a dry-inhibiting coating film formed from the coating fluid is increased in strength, and a coating film which can readily be broken by transferring of the ball toward a rear and movement caused by rotation is less liable to be obtained. Accordingly, it is not preferred. Acryl base synthetic resins are preferred, and said resins include homopolymers of (meth)acrylic acid esters, copolymers of two or more kinds of (meth)acrylic acid esters and copolymers of at least one of (meth)acrylic acid esters with styrene.

Further, the preferred resin is the acryl-base synthetic resin, as is the case with the first invention described above, which is obtained by copolymerizing monomers comprising the (meth)acrylic acid ester represented by the following Formula (I) in a range of 93 to 99% by weight and the basic nitrogen-containing monomer represented by the following Formula (II) in a range of 0.4% by weight or more and less than 2% by weight:

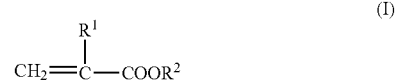

(I)

[in Formula (I) described above, R1 represents a hydrogen atom or a methyl group, and R2 represents a linear or branched hydrocarbon group having 1 to 18 carbon atoms or a hydrocarbon group having a naphthene ring or an aromatic ring];

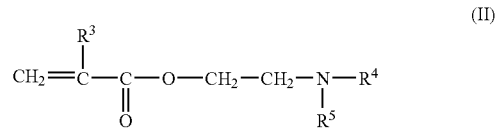

(II)

[in Formula (II) described above, R3 represents a hydrogen atom or a methyl group, and R4 and R5 each represent independently a methyl or ethyl group].

The (meth)acrylic acid ester described above includes methacrylates and acrylates such as methyl (meth)acrylate, ethyl (meth)acrylate, propyl (meth)acrylate, isopropyl (meth)acrylate, isobutyl (meth)acrylate, n-butyl (meth)acrylate, 2-ethylhexyl (meth)acrylate, octyl (meth)acrylate, lauryl (meth)acrylate, cetyl (meth)acrylate, stearyl (meth)acrylate and cyclohexyl (meth)acrylate.

The (meth)acrylic acid ester represented by Formula (I) is preferably used in an amount of 93 to 99% by weight as a copolymer component for the acryl base resin, and if the content is less than 93% by weight, it is likely that the solubility of the copolymer in organic solvents is deteriorated and that the drawn lines are fragile. On the other hand, if it exceeds 99% by weight, the dispersion stability of a pigment such as titanium oxide is deteriorated.

N,N-dimethylaminoethyl (meth)acrylate and N,N-diethylaminoethyl(meth)acrylate are used as the basic nitrogen-containing monomer represented by Formula (II).

The basic nitrogen-containing monomer represented by Formula (II) is preferably used in a range of 0.4% by weight or more and less than 2% by weight as a copolymer component for the acryl base resin. If this amount is less than 0.4% by weight, an amount of the resin adsorbed on the titanium oxide pigment is small, and particularly the dispersion stability of the pigment over a long period of time tends to be deteriorated. On the other hand, if it is 2.0% by weight or more, solubility of the acryl base resin itself in an organic solvent tends to be deteriorated, and said acryl base resin vanish itself is liable to cause phase separation during storage. As a result, the resin tends to be separated from the solvent with the passage of time, and deterioration in the storage stability due to inferior dispersion of the pigment (increase in the viscosity and a settling down of the pigment) and the inferior drawn lines (peeling and cracking of drawn lines) are liable to be brought about. This originates in that the basic nitrogen-containing monomer is intrinsically a strong hydrophilic monomer, and it is because solubility of the acryl resin itself in the organic solvent deteriorates as a content of said monomer is increased.

The acryl base synthetic resin which is used for the coating fluid of the second invention may be mixed, if necessary, with styrene monomer of less than 5% by weight as a copolymer component. Copolymerization with the above styrene monomer makes it possible that the copolymer makes the surface layer of the drawn lines more minute and provides flexible drawn lines. However, if it is 5% by weight or more, the copolymer is likely to deteriorate in the solubility in an organic solvent, and the drawn lines are likely to be fragile.

The acryl base resin used in the present invention can be produced by a solution polymerization method which has so far been publicly known.

The resin having the physical properties described above such as the acryl base resin which is used in the second invention is dissolved in an organic solvent and has a function as a resin for dispersing titanium oxide and other pigments suitably used. A use amount thereof has to be 9.7 to 22% by weight based on the coating fluid (total amount), and it is preferably 10 to 18% by weight. If the amount is less than 9.7% by weight, an amount of solid of the other components such as the pigment is predominant in a coating film formed by drying the coating fluid, and a lot of holes like air holes are formed on the surface of the coating film. The solvent is readily volatilized from the air holes, and the drying-inhibition effect which is the object is reduced. Accordingly, it is not preferred. On the other hand, if it exceeds 22% by weight, a coating film having an excellent drying-inhibition effect can be formed, but a coating film having an excellent drying-inhibition effect is formed as well on the surface of the drawn lines to reduce a drying property of the drawn lines, and therefore it is not preferred.

Figure 4:
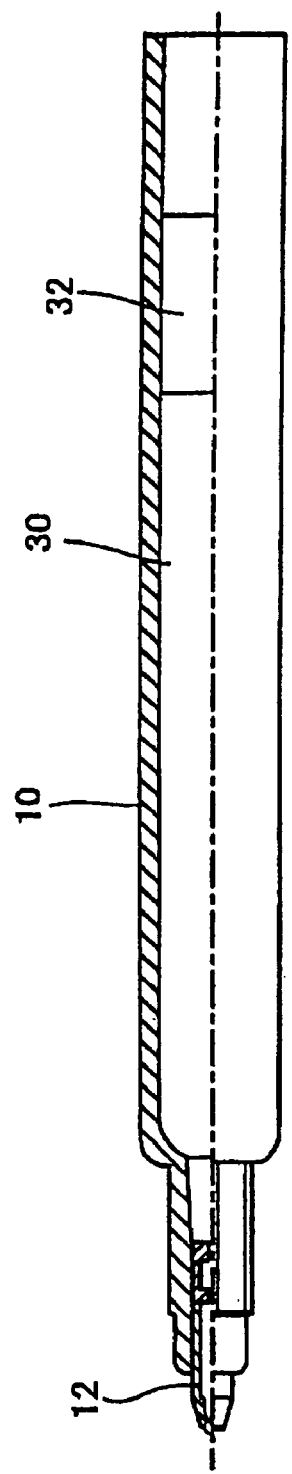
FIG. 4 is a partial vertical cross-sectional drawing showing (excluding a barrel) one example of the fluid applicator of the second invention.
Figure 5:
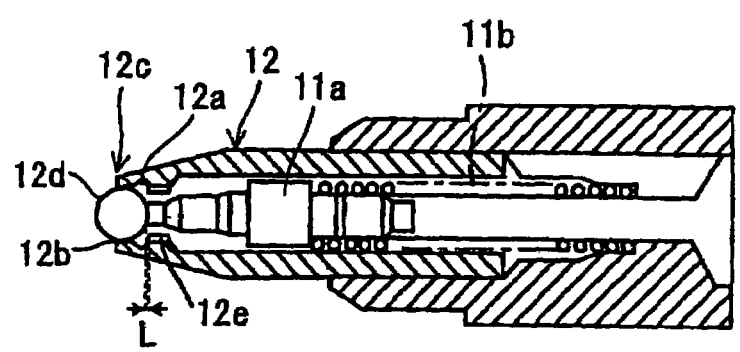
FIG. 5 is an enlarged vertical cross-sectional drawing of a tip structure (coating part) in FIG. 4.

FIG. 4 and FIG. 5 are a partial vertical cross-sectional drawing showing one example (excluding a barrel) of the embodiment of the fluid applicator of the second invention and an enlarged vertical cross-sectional drawing of the tip structure thereof.

The fluid applicator of the second invention is, as shown in FIG. 4 and FIG. 5, a fluid applicator which is equipped with a tip 12 of a ballpoint pen type at a point and a coating liquid reservoir 10 for receiving a coating fluid 30 at a rear, the tip of which comprises a tip main body 12c having a ball receiving chamber 12a for allowing the coating fluid 30 to flow in and having a front end aperture part 12b for discharging the coating fluid at a point part of the ball receiving chamber 12a, a ball 12d received in the ball receiving chamber 12a in the tip main body 12c, partially protruding from the front end aperture part 12b described above and airtightly closing the aperture part 12b, a spring 1ib applying pressure on the back face of the ball 12d to support the ball 12d from a rear by a pushing bar 11a and a ball receiving seat 12e controlling a moving distance (L: clearance) of the ball 12d toward a rear and in which the moving distance of the ball 12d toward the rear is 0.06 to 0.2 mm, wherein the coating fluid 30 comprises, as described above, at least titanium oxide, a resin and an organic solvent; the organic solvent comprises an organic solvent which has a vapor pressure of 1 mm Hg or more at 20° C. and a low polarity corresponding to a solubility parameter δ of 10 or less and which has relatively high volatility and the resin described above has a glass transition temperature (Tg) of 100° C. or lower and is contained in an amount of 9.7 to 22% by weight based on the total amount of the coating fluid.

The fluid applicator of the second invention shall not specifically be restricted as long as it has the structure described above, and it includes, for example, a usual ballpoint pen type fluid applicator having no pressurizing mechanism, a ballpoint pen type fluid applicator of a knock type equipped with a pressurizing pumping mechanism described in Japanese Patent Application Laid-Open No. 335173/2000 filed by the present applicants and a capless knock type fluid applicator of a pressurizing type which has the pressurizing mechanism shown in FIG. 1 in the first invention described above and which is detachable to a main body.

In the knock type fluid applicator of a pressurizing type, the coating fluid reservoir equipped with the tip structure shown in FIG. 4 and FIG. 5 can be used. To briefly explain the above structure and the like, it is, as is the case with the first invention, a fluid applicator A in which a refill unit 14 equipped with a ballpoint pen tip 12 (an example of a coating part) at a point and a coating fluid reservoir (refill) 10 at a rear is loaded in a barrel main body 18 in the state that it is resiliently pressed toward the rear by a first spring 16 and in which the ballpoint pen tip 12 of the refill unit 14 described above can come in and out from a point aperture 18a interlocking with push-out operation and releasing operation of a knock mechanism 20 provided at a rear end of the barrel main body 18, wherein a rear part 10r of the fluid reservoir 10 of the refill unit 14 described above is opened; a pressurizing mechanism 22 for increasing a pressure of the inside of the refill 10 is provided between the rear part 10r and the knock mechanism 20 in the barrel main body 18; the pressurizing mechanism 22 has a sealing part 24, a cylinder part 26 opened at a front end and a second spring 28 for resiliently pressing them in a direction in which the sealing part 24 and the cylinder part 26 are allowed to be detached; when a point of the ballpoint pen tip 12 protruding from the barrel main body 18 by the push-out operation of the knock mechanism 20 is pressed to allow the refill unit 14 to go back, the sealing part 24 goes back in the pressurizing mechanism 22, and the cylinder part 26 relatively goes forward to compress internal air in a pressurizing chamber 40; and a check valve is opened by compressed internal air to pressurize the inside of the refill 10 through the sealing part 24. The pressurizing mechanism 22 releases a pressurizing state in the refill 10 with retreating the ballpoint pen tip 12 of the refill unit 14 described above into the barrel main body 18 by releasing push-out of the knock mechanism 20. Further, the refill unit 14 described above is constituted from the refill 10 filled with a coating fluid (correction liquid) 30 and a follower 32 following the coating fluid 30 at a back end thereof and the ballpoint pen tip 12 pressed into the refill 10. A ball 12d which is rotatably interfitted in the inside of the ballpoint pen tip 12 is pressed toward the front by a spring (spring pressure) 1ib via a pushing bar 11a to be provided with a back pressure and closes a point aperture part of the ballpoint pen tip 12 in non-coating. A follower 32 is filled at a rear part of a coating fluid 30 for the purpose of preventing a solvent contained in the coating fluid 30 from volatilizing.

In the above fluid applicator, when it is exposed to the air over a long period of time with a cap off, the ball 12d is tightly brought into contact with an inner edge of a ball holding part by a pressing means to seal an aperture part, but the point part can not completely be sealed because of contact by metal (or ceramic)-metal (or ceramic). To be specific (micro), the coating fluid does not flow out to the outside, but a very slight microspace is formed, and the inside of the tip resides in the state that it communicates with the air via the above microspace.

If the fluid applicator A is left standing in the above state (cap off state), the solvent contained in the coating fluid is vaporized, whereby the coating fluid is liable to be solidified in the above microspace or the coating fluid in the tip is liable to be dried, so that the coating fluid can not be discharged or dose not discharge in a normal amount.

In the second invention, the coating fluid comprising at least the composition described above is filled in the fluid applicator, whereby a coating film of the coating fluid 30 is formed in the microspace between the ball 12d and the ball holding part by volatilization of a trace amount of the solvent when exposed to the air with a cap off, and the solvent which is a volatile component is inhibited from vaporizing by the coating film to allow drying and solidifying of the coating fluid 30 to be in a minimum level. This coating film is broken by moving of the ball toward a rear in a range of 0.06 to 0.2 mm (L) and rotation of the ball when carrying out a coating operation, and the coating fluid suitably discharges from the ball. When it is left again in a cap off state over a long period of time, a coating film is formed in the microspace as is the case with the above. If the above clearance (L) of the ball is less than 0.06 mm, moving of the ball toward the rear is little, and such a satisfactory force as breaking the coating film is less liable to be exerted. On the other hand, if the clearance (L) of the ball exceeds 0.2 mm, the above coating film formed is increased too much in a thickness, and the coating film is less liable to be broken by moving of the ball toward the rear and rotation of the ball. Accordingly, it is not preferred.

In the fluid applicator of the second invention, a load of the spring for pressing the point ball applied on the back face of the point ball 12d by the spring member 11b is preferably 0.1 to 1.5N from the viewpoints of improving a cap off property which is another effect of the present invention and bringing the point ball tightly into contact with an inner edge of the ball holding part to the utmost to seal in order to allow the coating fluid to form a coating film having a suitable film strength and a suitable film thickness in the microspace of the ball holding part so that more solvent than necessary is not volatilized from the coating fluid.

Further, from the viewpoints of securing the suitable discharge amount and making it easier to break a coating film formed from the coating fluid in the microspace of the ball holding part in carrying out coating operation, the coating fluid reservoir 10 or the rear end part thereof is preferably equipped with a pressing means or a pressurizing mechanism so that the coating fluid 30 filled into the coating fluid reservoir 10 can be coated with being pressurized.

In the cap off function in the present invention, shown is a repetitive effect of coating film formations coating (writing)→coating film formation→coating (writing) - - - -, that is, formed is a reproductive coating film which is always reproduced in the microspace and which is broken in coating (writing). This effect is repeated until the coating fluid filled into the coating fluid reservoir is exhausted.

Accordingly, the coating film is reproduced many times after coating (writing) by reproducing the coating film by virtue of the coating fluid and the point tip structure of the present invention after the coating film is broken in coating, and therefore provided are the coating fluid and the fluid applicator which can carry out good coating (writing) work without causing dry-up even after exposed to the air with a cap off over a long period of time, that is, over a long period of time exceeding 3 months in the present invention and which are excellent in a cap off performance.

Next, the embodiment of the third invention shall be explained in details.

The fluid applicator of the third invention is a fluid applicator which is equipped with a coating fluid reservoir loaded in a barrel main body, in which the coating fluid reservoir is filled with a coating fluid containing an organic solvent selected from the following A group and a colorant and having a shear thinning property, which is equipped with a ballpoint pen tip having a discharge-controlling mechanism at a point and in which a point part of said tip is sealed with a resin coating film formed from a hot melt adhesive, wherein the resin coating film is a coating film formed from polymerized fatty acid-modified polyamide represented by the following Formula (III), and said coating film has a pulling strength of 1 to 10N under the condition of 25° C. and 60 RH % measured by means of a push-pull tester;

A group: n-hexane, n-heptane, n-octane, isooctane, cyclohexane, methylcyclohexane, ethylcyclohexane, toluene and xylene:

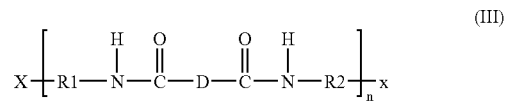

(III)

[in Formula (III) described above, D is a dimer acid frame; X is a terminal group such as —COOH, —NH$_2$ and —H; R1 and R2 are amine frames; and n is a positive number].

Figure 6:
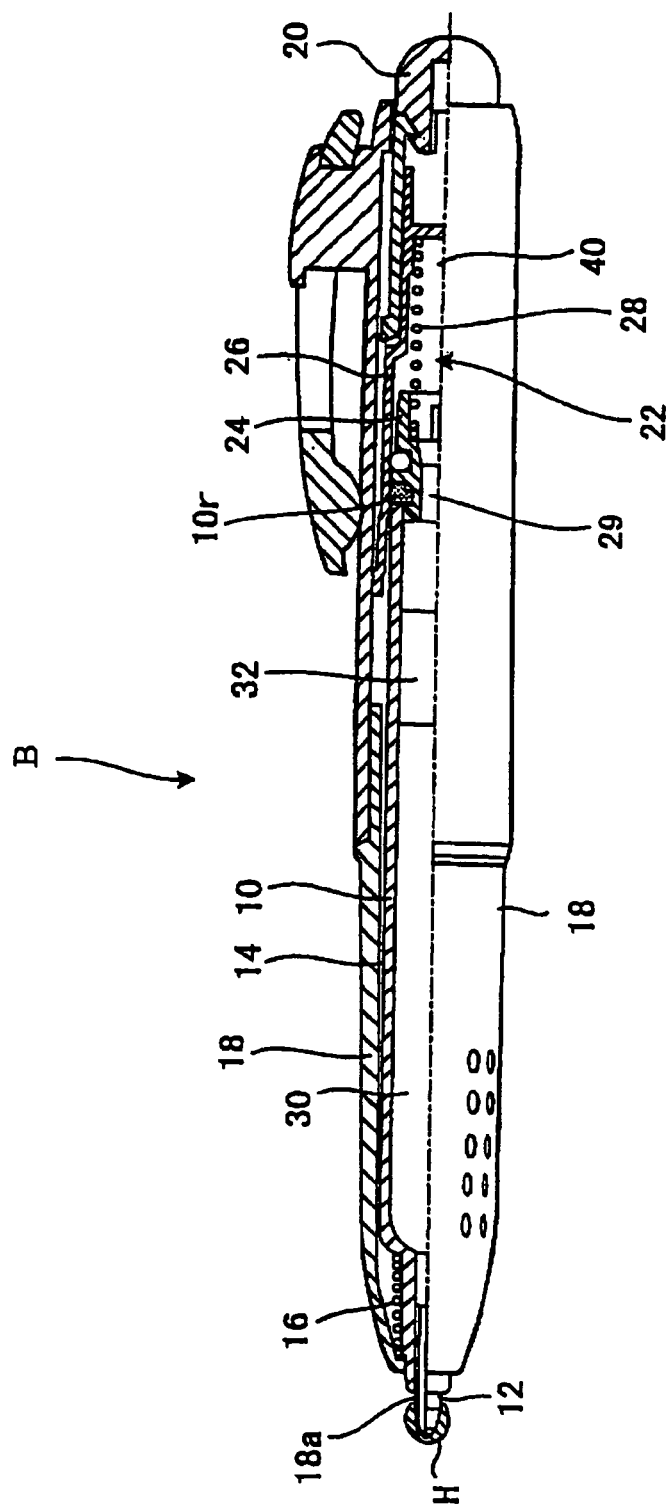
FIG. 6 is a partial vertical cross-sectional drawing showing one example of the fluid applicator of the third invention.
Figure 7:
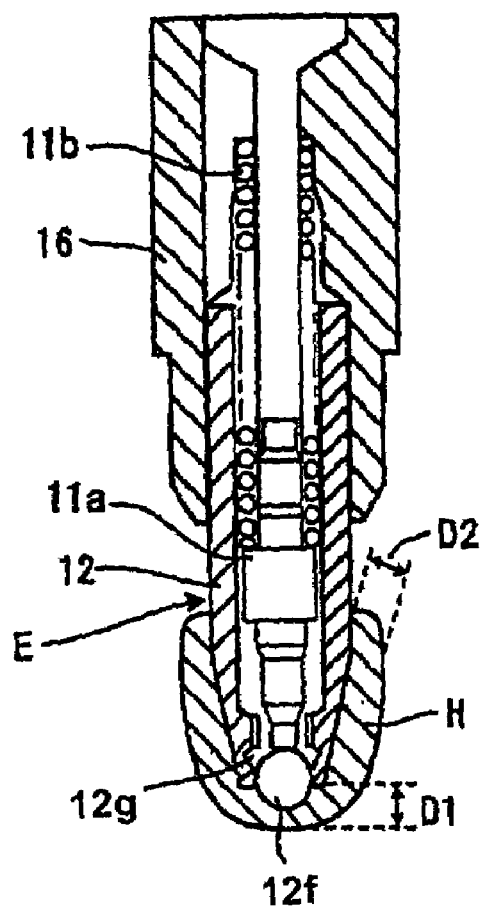
FIG. 7 is an enlarged vertical cross-sectional drawing showing an essential part in FIG. 6.

FIG. 6 and FIG. 7 are drawings showing one example of the fluid applicator of the third invention, wherein FIG. 6 is a partial vertical cross-sectional drawing showing the fluid applicator, and FIG. 7 is an enlarged vertical cross-sectional drawing showing an essential part of the fluid applicator of the third invention.

The fluid applicator B is, as shown in FIG. 6 and FIG. 7, equipped with a coating fluid reservoir 10 loaded in a barrel main body 18; the coating fluid reservoir 10 is filled with a coating fluid 30 containing an organic solvent selected from the A group described above and a colorant and having a shear thinning property; it is equipped with a ballpoint pen tip 12 having a discharge-controlling mechanism at a point; and a point part of said tip 12 is sealed with a resin coating film H formed from a hot melt adhesive. A transferring ball 12f made of metal such as hard metal (or made of ceramic) is loaded in the inside of the tip point part 12 which is a pen tip.

The tip 12 of a ballpoint pen type presents, as shown in FIG. 7, an approximately cylindrical outline, and a point part thereof is formed in a steeple shape. A circular aperture part in a plane view is formed at the point part thereof, and said aperture part is opened in a smaller size than outside diameter of the transferring ball 12f mounted therein. A ball holding part 12g for holding the transferring ball 12f is formed in the inside of the point part described above, and the ball holding part 12g communicates with the aperture part described above at a point side and communicates with a coating fluid passage at a rear end side.

An elastic material comprising a ball pushing rod member 11a for pushing the transferring ball 12f from a back face thereof toward a point direction and a coil spring 11b is disposed at a rear of the transferring ball 12f mounted in the ball holding part 12b.

In the third invention, the resin coating film H for sealing a point part of the tip 12 is constituted from polymerized fatty acid-modified polyamide represented by Formula (III) described above which comprises polymerized fatty acid (dimeric acid) and diamine(ethylenediamine, hexamethylenediamine, metaxylylenediamine, polyoxypropylenediamine and the like) as principal raw materials and which is solid at room temperature.

The polymerized fatty acid-modified polyamide represented by Formula (III) described above is a little varied in characteristics depending on the kind of the diamine used (ethylenediamine, hexamethylenediamine, metaxylylenediamine, polyoxypropylenediamine and the like), and it has a softening point (ring and ball method) of $100\pm5$ to $210\pm5°$ C., a viscosity (single cylinder rotational viscometer, 200° C.) of 200 to 20000 mPa·s and a specific gravity (20/20° C.) of 0.97 to 1.01.

A coating film of the polymerized fatty acid-modified polyamide having the above characteristics can be formed by using a hot melt adhesive such as Tohmide 394, ditto 535, ditto 558, ditto 1350 and ditto 1360 (manufactured by Fuji Kasei Kogyo Co., Ltd.).

A method for forming (sealing) a coating film of the polymerized fatty acid-modified polyamide on a point part of the tip 12 includes a method in which a point part of the tip is dipped in the polymerized fatty acid-modified polyamide molten by heating at a temperature of a softening point or higher and in which the heated and molten polymerized fatty acid-modified polyamide is then solidified by pulling up and cooling (natural drying) the point part of the tip to form a resin coating film on the point part of the tip 12.

This resin coating film H has to have a pulling strength of 1 to 10N measured under the condition of 25° C. and 60 RH % by means of a push-pull tester from the viewpoint of achieving the effects of the present invention, and it is preferably 2 to 8N.

If the pulling strength is less than 1N, the coating film is liable to be peeled by abrasion, contact and impact, and the effects of the present invention can not be exhibited. On the other hand, if the pulling strength exceeds 10N, the sealing performance thereof can sufficiently be achieved even when long period is required from production to use, but it is difficult to peel the resin coating film H, and the tip is likely to be pulled out. Accordingly, both the ranges are not preferred.

The tip 12 is fixed on a front end part of the coating fluid reservoir 10, and a peeling strength for releasing the tip 12 from the coating fluid reservoir 10 is two times or more larger than a maximum pulling strength 10N of the coating film H described above, so that the tip 12 is not likely at all to be pulled out when peeling the coating film H.

Further, in order to certainly prevent a solvent having high volatility from volatilizing from the tip point and further to surely protect the tip point part, D1<D2 is preferably achieved, as shown in FIG. 7, in a thickness of the sealed part comprising the resin coating film H at a point part of the ballpoint pen tip, wherein D1 is a maximum thickness of the seal in the ball part, and D2 is a minimum thickness of the seal in the tip part.

The form of the seal H comprising the resin coating film shall not specifically be restricted as long as it is the resin coating film having physical properties described above which can certainly prevent a solvent having high volatility from volatilizing from the tip point and can surely protect the tip point part. It includes, for example, a reverse hanging bell form shown in FIG. 8, a conical form shown in FIG. 9 and a droplet form shown in FIG. 10 (including FIG. 6).

Further, in respect to the position of the seal H comprising the resin coating film, a work of peeling the resin coating film H by fingers may be simplified, as shown in FIG. 7, by providing a non-coated part (E) on the tip part 12 at the point of a tip joint.

The pulling strength, the form of the resin coating film H and the coating amount (thickness) each described above can be controlled by the melting temperature, the dipping depth and the pulling-up speed.

The resin coating film H formed from the above polymerized fatty acid-modified polyamide exhibits an excellent sealing performance at the tip point part even if it is filled with the fluid containing a solvent of the A group having high volatility described above, that is, n-hexane, cyclohexane, methylcyclohexane and the like, and the solvent is not vaporized at all from the sealed part even when long period is required from production to use. The resin coating film H formed from the polymerized fatty acid-modified polyamide can exhibit, as shall actually be verified in examples described later, a particularly excellent sealing performance which has not so far been achieved.

The resin coating film H formed from the polymerized fatty acid-modified polyamide is not corroded by the coating fluid used, and though films have weak adhesive strength to a stainless tip in many cases, it has suited adhesive strength thereto.

Used as the coating fluid 30 filled in the coating fluid reservoir 10 described above is, for example, a liquid obtained by suitably dissolving or dispersing a colorant including pigments such as inorganic pigments such as carbon black and titanium dioxide, organic pigments, resin pigments and hollow resin pigments and dyes such as oil-soluble dyes, at least one organic solvent selected from the A group described above, a thickener which is soluble in the organic solvent, resins as a binder, surfactants, a perfume and other optional components used according to uses of fluids for writing instruments, correction devices, adhesive applicators and toilet tools.

In respect to the blending amounts thereof, preferred is, for example, 20 to 85% by weight of the organic solvent, 10 to 60% by weight of the colorant such as pigments and 5 to 30% by weight of the resins and the other components based on the total amount (100% by weight) of the coating fluid.

The coating fluid described above may be used as it is, and it may be used in the form of a gel ink (viscous matter) obtained by adding to the fluid tackifiers such as fine powder silica, alumina, dibenzyl disorbitol, organic treated bentonite, 12-hydroxystearic acid and derivatives thereof, hardened castor oil and derivatives thereof, N-lauroyl-L-glutamic acid-α,γ-di-n-butylamide, paraffin wax and polyethylene wax. The gel ink makes it easy to inhibit, even if the fluid is blended with the colorants such as heavy pigments (titanium oxide and the like), them from settling down and makes it possible, when coating the fluid such as an ink and a correction liquid on a material to be coated such as paper, to inhibit (feathering) on the material by virtue of a structural viscosity endowed thereto.

A follower 32 filled in the coating fluid reservoir 10 is a scarcely volatile liquid material which is not compatible with the coating fluid 30 described above, and it is filled at a back end part of the coating fluid in a contact state therewith and moves following the fluid as the fluid is consumed to act as a movable stopper.

In the third invention, the material of the coating fluid reservoir 10 for storing the coating fluid shall not specifically be restricted as long as it is a material which is free of a volatilizing problem of the organic solvent comprising a volatile non-polar solvent as a principal solvent from a side face of the reservoir and a problem of corroding the reservoir itself by the solvent and which secures strength required at a distribution stage and has visibility making it easy to observe a remaining amount of the content in use. It includes, for example, molded articles comprising aliphatic polyamides such as nylon 12, molded articles prepared by polymetaxylyleneadipamide resins obtained from monomers having an aromatic ring or a naphthene ring and copolymers of terephthalic acid, isophthalic acid and hexamethylenediamine or molded articles prepared by blends of the above resins.

The fluid applicator of the third invention thus constituted is used in a form of a fluid applicator in which a joint (front barrel) member is, as is the case with conventional ballpoint pen forms, receivable by a structure such as screwing into a main body (barrel) having a cap or having no cap for allowing a fluid to flow out, a ballpoint pen type capless fluid applicator of a knock type equipped with a pressurized pumping mechanism described in Japanese Patent Application Laid-Open No. 335173/2000 filed by the present applicant and a knock type capless fluid applicator of a pressurizing type which is receivable into a main body having the pressurizing mechanism shown in FIG. 6.

The structure and the like of the knock type fluid applicator of a pressurizing type shown in FIG. 6 are the same as in the first invention described above, and to explain briefly, it is a fluid applicator in which a refill unit 14 equipped with a ballpoint pen tip 12 (an example of a coating part) at a point and a fluid reservoir 10 at a rear is loaded in a barrel main body 18 in the state that it is resiliently pressed toward the rear by a first spring 16 and in which the ballpoint pen tip 12 of the refill unit 14 can come in and out from a point aperture 18a interlocking with push-out operation and releasing operation of a knock mechanism 20 provided at a rear end side of the barrel main body 18, wherein a rear part 10r in the fluid reservoir 10 of the refill unit 14 is opened; a pressurizing mechanism 22 for increasing a pressure of the inside of the fluid reservoir 10 is provided between said rear part 10r and the knock mechanism 20 in the barrel main body 18; the pressurizing mechanism 22 has a sealing part 24, a cylinder part 26 opened at a front end and a second spring 28 for resiliently pressing them in a direction in which the sealing part 24 and the cylinder part 26 are allowed to be detached; when a point of the ballpoint pen tip 12 protruding from the barrel main body 18 by the push-out operation of the knock mechanism 20 is pressed to allow the refill unit 14 to go back, the sealing part 24 goes back in the pressurizing mechanism 22, and the cylinder part 26 relatively goes forward to compress internal air in a pressurizing chamber 40; and a check valve is opened by the compressed internal air to pressurize the inside of the fluid reservoir 10 through the sealing part 24.

Also, the pressurizing mechanism 22 releases a pressurizing state in the refill 10 with retreating the ballpoint pen tip 12 of the refill unit 14 into the barrel main body 18 by releasing push-out of the knock mechanism 20.

Further, the refill unit 14 described above is constituted from the fluid reservoir 10 filled with a coating fluid 30 and a follower 32 following the coating fluid 30 at a back end thereof and the ballpoint pen tip 12 pressed into a front of the fluid reservoir 10. A ball which is rotatably interfitted in the inside of a point of the ballpoint pen tip 12 is pressed toward the front by a spring via a pushing bar to be provided with a back pressure, and it closes a point aperture part of the ballpoint pen tip 12 in non-coating. The follower 32 is filled at a rear part of the coating fluid 30 contained in the refill 10 for the purpose of preventing a solvent contained in the coating fluid 30 from volatilizing.

According to the above fluid applicator B, because an outside diameter of the ball is set to a smaller level than that of the aperture part 18a in the barrel main body 18, it assumes a structure in which it is mounted in the barrel main body 18 in non-use even when a seal H is formed from the tip resin coating film. In use, the point part of the tip 12 is put out from the barrel main body 18 by knocking (refer to FIG. 6), and the applicator is used by releasing the resin coating film H adhered on the point of the tip 12 with fingers.

In the above fluid applicator B, when a discharge amount of the coating fluid is required, the point of the tip 12 protruding from the barrel main body 18 is pressed onto a face to be coated, whereby the fluid reservoir 10 can further be pushed into the pressurizing mechanism to apply a larger pressurizing force into the fluid reservoir 10. As described above, pressure can be applied only in use, and therefore a correction liquid can be prevented from leaking in non-use. Even if left standing in a knocked state, pressurized air gradually leaks, and therefore the correction liquid is not likely to leak. Further, the prescribed correction liquid in which a titanium oxide pigment is inhibited from settling down can be used, and therefore troubles of stirring the correction liquid and removing the cap are solved. Also, pressure can be applied at the same time as interlocking with a knocking action, and therefore the user can use the applicator without being conscious of pressurization to have good operation feeling.

Further, the fluid reservoir itself is excellent in transparency and visibility and does not require a part for pressurization, so that the cost of the refill can be controlled to a lower level, and a running cost for exchanging the refill can be reduced.

Further, the pressurizing chamber of the cylinder part communicates with the air by releasing knock, and therefore pressure is not continuously applied even if a knock action is repeated. Also, the deficiency that the coating fluid discharges too much on a paper surface is not caused.

In the third invention thus constituted, formation of the resin coating sealing the point of the ballpoint pen tip formed from the polymerized fatty acid-modified polyamide represented by Formula (III) described above and setting a pulling strength thereof to 1 to 10N make it possible to obtain a fluid applicator in which the solvent is certainly prevented from volatilizing from the tip point even if filled with a coating fluid containing a solvent having high volatility and in which the tip point part is securely protected and simple refillability and caplessness are achieved.

The gist of the third invention resides, as described above, in the point that a point of the ballpoint pen tip having a flow controlling mechanism is sealed with the specific resin coating film, and therefore the structure of the coating liquid reservoir and the structure of the applicator main body mounting the above reservoir shall not specifically be restricted. It is a matter of course that the structure of the coating liquid reservoir and the structure of the applicator main body can variously be changed as long as they do not deviate from the scope of the present invention.

EXAMPLES

Next, the fluid applicator of the first invention shall be explained in further details with reference to examples and comparative examples, but the present invention shall not be restricted to the examples described below. All blend units shown in Table 1 are parts by weight.

Examples 1 to 14 and Comparative Examples 1 to 6

First Invention

The respective acryl base synthetic resins used in the examples and the comparative examples were prepared in the following manner according to formulations shown in the following Table 1.

Preparation of Acryl Base Synthetic Resin Solutions (A1 to A7)

A reaction vessel of 800 ml equipped with a thermometer, a stirrer, a heating jacket and a reflux condenser was charged with components shown in the following Table 1 to start solution polymerization at 80° C. under nitrogen gas flow. Polymerization time was controlled while the resin in course of the reaction was sampled in the middle of the polymerization to confirm the number average molecular weight, whereby acryl base synthetic resin solutions of an effective resin concentration of 40% having the intended number average molecular weight were obtained. In A1 and A5 to A7, the blend composition was the same, but the polymerization time was controlled to change the number average molecular weights.

ink at a stand speed (a speed at which a disc pushes the ink) of 2 cm/minute using a disc type adaptor having a diameter of 20 mm by means of Rhometer NRM-010J-CW (manufactured by Fudo Kogyo Co., Ltd.). Formation of a settling layer was evaluated by a load change rate obtained according to the following equation and the evaluation criteria:

load change rate (%)=□(load 2−load 1)+load 2□×100 load 1: a load in a height of 45 mm from the bottom of the a ink load 2: a load in a height of 5 mm from the bottom of the ink Evaluation Criteria:

: no formation of settling layer (load change rate was less than 1%)

○: little formation of settling layer (load change rate was 1% or more and less than 5%)

Δ: a little formation of settling layer (load change rate was 5% or more and less than 10%)

X: formation of settling layer present (load change rate was 10% or more)

TABLE 1

| Acryl synthetic resin solutions | A1 | A2 | A3 | A4 | A5 | A6 | A7 |
|---|---|---|---|---|---|---|---|
| n-Butyl methacrylate | 56 | 56 | 56 | 56 | 56 | 56 | 56 |
| Butyl acrylate | 14 | 5 | 3 | 8 | 14 | 14 | 14 |
| 2-Ethylhexyl methacrylate | 28.2 | 38 | 38 | 28 | 28.2 | 28.2 | 28.2 |
| N,N-diethylaminoethyl methacrylate | 1.8 | 1 | 3 | 8 | 1.8 | 1.8 | 1.8 |
| Ethylcyclohexane | 150 | 150 | 150 | 150 | 150 | 150 | 150 |
| Azobisisobutyronitrile | 1 | 1 | 1 | 1 | 1 | 1 | 1 |
| Number average molecular weight (Mn) | 39600 | 39000 | 41000 | 42000 | 9800 | 188000 | 210000 |

Preparation of Coating Fluids

The acryl base synthetic resin solutions (A1 to A7) shown in Table 1 which were obtained above were used to mix and disperse components in formulations shown in the following Table 2 for 16 hours by means of a ball mill or mix and disperse them in a pressure vessel (autoclave) equipped with a stirrer with heating, whereby the respective coating fluids were obtained.

The respective coating fluids obtained in the examples and the comparative examples were used to evaluate a viscosity, formation of a settling layer, ink fluidity, a leveling property and syneresis by the following methods. The results thereof are shown in the following Table 2 and Table 3.

Measurement of Viscosity

The viscosities of the respective coating fluids obtained in the examples and the comparative examples were measured under the following conditions.

Sample: left standing still for a whole day and night in tightly closable glass vessel Measuring temperature: 25° C.

Viscometer: E type viscometer (VISCOMETER TV-20 EMD, manufactured by Tokimec Inc.)

Revolution: 1 rpm, 100 rpm

Evaluating Method of Formation of a Settling Layer

A vessel having an inner diameter of 30 mm was charged with the ink in a height of 50 mm to measure a load of the Evaluation Method of Ink Fluidity A vessel having an inner diameter of 30 mm and a height of 65 mm was charged with the ink in a height of 30 mm and left standing in a tightly closed state using a highly sealable stopper. Then, measured was time in which the ink flowed in the vessel when the vessel was leaned by 90 degrees. The time in which the ink flowed in the vessel was shown by time in which the ink present in an upper part (a height of 30 cm from the bottom of the vessel) in still standing reached the stopper (65 cm from the bottom of the vessel) when the vessel was leaned by 90 degrees, and it was evaluated according to the following evaluation criteria. Evaluation criteria:

: large fluidity (reaching time was shorter than 2 seconds)

○: good fluidity (reaching time was shorter than 5 seconds)

Δ: inferior fluidity (reaching time was shorter than 15 seconds)

X: no fluidity (reaching time was 15 seconds or longer)

Evaluation Method of Leveling Property

A vessel (CLB-200EW, manufactured by Mitsubishi Pencil Co., Ltd.) which was equipped with a ballpoint pen tip at a point and an ink reservoir at a rear and in which a spring pressure was applied onto a back face of a point ball (ball diameter: 1.0 mm) so that the point ball was brought into tight contact with an inner edge of a ball holding part at a tip point was charged with the ink, and it was used to paint out the inside of a square of 3.0 cm square to evaluate a leveling property thereof according to the following evaluation criteria.

Evaluation Criteria:
- : large leveling property (area of a smooth part in the square was 90 to 100%)
- ○: good leveling property (area of a smooth part in the square was 80 to 90%)
- Δ: inferior leveling property (area of a smooth part in the square was 50 to 80%)
- X: no leveling property (area of a smooth part in the square was 0 to 50%)

Evaluation Method of Syneresis

An apparatus-specified vessel having an inner diameter of 16 mm and a height of 145 mm was charged with the ink in a height of 80 mm and left standing in a tightly closed state using a highly sealable specified stopper. Then, a dispersion evaluating apparatus TURBISCAN-MA2000 (manufactured by Formulation Co., Ltd.) was used to measure a range in which a transmission intensity was 50% or more in an upper part of the ink, and it was evaluated according to the following evaluation criteria. The measured distance was shown by setting the uppermost face (a height of 80 cm from the bottom of the vessel) of the ink to a standard value of zero.

Evaluation Criteria:
- : no syneresis (measured distance was 0 to 2 mm)
- ○: little syneresis (measured distance was 2 to 4 mm)
- Δ: a little syneresis (measured distance was 4 to 10 mm)
- X: syneresis present (measured distance was 10 mm or more)

TABLE 2

| | Example | | | | | | | | | | | | | | Comparative Example | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 | 3 | 4 | 5 | 6 |
| Titanium dioxide*1 | 40 | 40 | 40 | 40 | 20 | 20 | 40 | 40 | 40 | 40 | 40 | 40 | 40 | 40 | 40 | 40 | 40 | 40 | 10 | 40 |
| Hollow particle*2 | | | | | | 10 | | | | | | | | | | | | | | |
| Resin (Table 1 and others) | | | | | | | | | | | | | | | | | | | | |
| Acryl synthetic resin A1 | 31 | | 27 | 18 | 31 | 31 | | 31 | | | | | | | 31 | 31 | 11 | 85 | 31 | 31 |
| Acryl synthetic resin A2 | | 31 | | | | | | | | | | | | | | | | | | |
| Acryl synthetic resin A3 | | | | | | | | | | | | 31 | | | | | | | | |
| Acryl synthetic resin A4 | | | | | | | | | | | | | 31 | 31 | | | | | | |
| Acryl synthetic resin A5 | | | | | | | | | 31 | | | | | | | | | | | |
| Acryl synthetic resin A6 | | | | | | | | | | | 31 | | | | | | | | | |
| Acryl synthetic resin A7 | | | | | | | | | | 31 | | | | | | | | | | |
| Alkylphenol resin*3 | | | | | | | 31 | | | | | | | | | | | | | |
| Organic solvent | | | | | | | | | | | | | | | | | | | | |
| Methylcyclohexane | 26 | 26 | 32 | 37.5 | 46 | 36 | 26 | | 26 | 26 | 26 | 26 | 26 | 25 | 28.5 | 24 | 46 | 2 | 26 | 26 |
| Xylene | | | | | | | | 26 | | | | | | | | | | | | |
| Additive 1 (providing shear thinning property) | | | | | | | | | | | | | | | | | | | | |
| GP-1*4 | 3 | 3 | 1 | 4.5 | 3 | 3 | 3 | 3 | 3 | 3 | 3 | 3 | 3 | 3 | 0.5 | 5 | 3 | 3 | | |
| SPN*5 | | | | | | | | | | | | | | | | | | | 3 | |
| 12-Hydroxystearic acid | | | | | | | | | | | | | | | | | | | | 3 |

TABLE 2-continued

|  | Example | | | | | | | | | | | | | | Comparative Example | | | | | |
|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 | 3 | 4 | 5 | 6 |
| Additive 2 | | | | | | | | | | | | | | | | | | | | |
| Trimethylsiloxy silicate | | | | | | | | | | | | | | 1 | | | | | | |
| Viscosity (mPa·s) | | | | | | | | | | | | | | | | | | | | |
| Shearing rate (5 s$^{-1}$) | 2200 | 2500 | 1800 | 4600 | 2000 | 2100 | 2600 | 3000 | 1500 | 4000 | 5000 | 4500 | 4300 | 2100 | 1000 | 5000 | 2500 | 4000 | 1800 | 2000 |
| Shearing rate (400 s$^{-1}$) | 170 | 180 | 100 | 240 | 120 | 130 | 190 | 200 | 150 | 200 | 240 | 230 | 220 | 170 | 70 | 250 | 250 | 250 | 200 | 160 |

*1: KR-380N (manufactured by Titan Kogyo Co., Ltd.),
*2: SX866 (manufactured by JSR Corporation),
*3: Hitanol 1501 (manufactured by Hitachi Chemical Co., Ltd.),
*4: N-lauroyl-L-glutamic acid-α, γ-di-n-butylamide (manufactured by Ajinomoto Co., Inc.),
*5: Synthetic smectite (manufactured by CO-OP Chemical Co., Ltd.)

TABLE 3

|  |  | Example | | | | | | | | | | | | | | Comparative Example | | | | | |
|---|---|---|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 1 | 2 | 3 | 4 | 5 | 6 |
| Formation of Settling layer | RT 2 months | ⊙ | ⊙ | ⊙ | ⊙ | ⊙ | ⊙ | ⊙ | ⊙ | ⊙ | ⊙ | ⊙ | ⊙ | ⊙ | ⊙ | Δ | ⊙ | ⊙ | ○ | ○ | ○ |
|  | RT 3 months | ⊙ | ⊙ | ○ | ⊙ | ⊙ | ⊙ | ⊙ | ○ | ○ | ⊙ | ⊙ | ○ | ○ | ○ | X | ⊙ | ○ | X | Δ | Δ |
|  | RT 6 months | ⊙ | ⊙ | ○ | ⊙ | ⊙ | ⊙ | ⊙ | ○ | ○ | ⊙ | ⊙ | ○ | ○ | ○ | X | ⊙ | Δ | X | X | X |
| Ink fluidity | RT 2 months | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | Δ | Δ | ○ | ○ | ○ |
|  | RT 3 months | ⊙ | ⊙ | ⊙ | ○ | ⊙ | ⊙ | ⊙ | ○ | ○ | ⊙ | ⊙ | ○ | ○ | ○ | ⊙ | Δ | Δ | ○ | Δ | Δ |
|  | RT 6 months | ⊙ | ⊙ | ⊙ | ○ | ⊙ | ⊙ | ⊙ | ○ | ○ | ⊙ | ⊙ | ○ | ○ | ○ | ⊙ | X | X | Δ | X | X |
| Leveling property | RT 2 months | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | Δ | Δ | ○ | ○ | ○ |
|  | RT 3 months | ⊙ | ⊙ | ⊙ | ○ | ⊙ | ⊙ | ⊙ | ○ | ○ | ⊙ | ⊙ | ○ | ○ | ○ | ⊙ | Δ | Δ | Δ | Δ | Δ |
|  | RT 6 months | ⊙ | ⊙ | ⊙ | ○ | ⊙ | ⊙ | ⊙ | ○ | ○ | ⊙ | ⊙ | ○ | ○ | ○ | ⊙ | X | X | X | X | X |
| Syneresis | RT 2 months | ⊙ | ⊙ | ⊙ | ⊙ | ⊙ | ⊙ | ⊙ | ⊙ | ⊙ | ⊙ | ⊙ | ⊙ | ⊙ | ⊙ | ○ | ⊙ | ⊙ | ○ | ○ | ○ |
|  | RT 3 months | ⊙ | ⊙ | ⊙ | ⊙ | ⊙ | ⊙ | ⊙ | ⊙ | ○ | ○ | ○ | ○ | ○ | ○ | X | ⊙ | ○ | X | Δ | Δ |
|  | RT 6 months | ⊙ | ⊙ | ○ | ⊙ | ⊙ | ⊙ | ○ | ⊙ | ○ | ○ | ○ | ○ | ○ | ○ | X | ⊙ | Δ | X | X | X |

As apparent from the results shown in Table 2 to Table 3 described above, it has been found that in Examples 1 to 14 falling in the scope of the first invention as compared with Comparative Examples 1 to 6 falling outside the scope of the first invention, titanium oxide is inhibited from settling down even in a long period of 2 months or longer and that fluidity and a leveling property of the ink compositions are secured and syneresis can be inhibited as well to a large extent.

Particularly in Examples 1, 2, 5, 6 and 14, it has been found that since the acryl base resins each having a number average molecular weight of 10000 to 50000 are used as the resin, titanium oxide is further inhibited from settling down even in a further long period of 3 months or longer and that fluidity and a leveling property of the ink compositions are further secured and syneresis observed in coating fluids can be further inhibited as well to a large extent.

Examples 15 to 34 and Comparative Examples 7 to 14

Second Invention

The respective acryl base synthetic resins used in the examples and the comparative examples were prepared in the following manner according to the following formulations compositions.

Preparation of Acryl Base Synthetic Resin Solutions (B1 to B2)

A reaction vessel of 800 ml equipped with a thermometer, a stirrer, a heating jacket and a reflux condenser was charged with components shown in the following Table 4 to start solution polymerization at 80° C. under nitrogen gas flow. Reaction was allowed to proceed while the resin in course of the reaction was sampled in the middle of the polymerization, whereby the intended acryl base synthetic resin solutions having an effective resin concentration of 40% were obtained.

TABLE 4

| Acryl base synthetic resin solutions | B1 | B2 |
|---|---|---|
| n-Butyl methacrylate | 56 | 56 |
| Butyl acrylate | 14 | 3 |
| 2-Ethylhexyl methacrylate | 28.2 | 38 |
| N,N-diethylaminoethyl methacrylate | 1.8 | 3 |
| Ethylcyclohexane | 150 | 150 |
| Azobisisobutyronitrile | 1.2 | 1.2 |
| Glass transition temperature (Tg, ° C.) | 10 to 15 | 8 to 13 |

Preparation of Coating Fluids

Components in formulations shown in the following Table 5 were mixed and dispersed for 16 hours by means of a ball mill or mixed and dispersed in a pressure vessel (autoclave) equipped with a stirrer with heating, whereby the respective coating fluids (ink compositions) were obtained.

The respective ink compositions obtained in the examples and the comparative examples were used to evaluate a viscosity, a cap-off property and a coating property by the following methods. The results thereof are shown in the following Tables 5 and 6. The following fluid applicators were used in the exampled and the comparative examples. Signs ☆ shown in Table 6 described below show selected matters in the coating fluids, the tip clearances, the spring pressures and the presence of the pressurizing mechanism.

Measurement of Viscosity

The viscosities of the respective coating fluids obtained in the examples and the comparative examples were measured under the following conditions.

Sample: left standing still for a whole day and night in tightly closable glass vessel Measuring temperature: 25° C.

Viscometer: E type viscometer (VISCOMETER TV-20 EMD, manufactured by Tokimec Inc.)

Revolution: 1 rpm, 100 rpm

Preparation of Respective Fluid Applicators

Respective fluid applicators were prepared according to FIG. 1 and FIG. 5 in which coating fluid reservoirs were filled with coating fluids shown in the following Table 5 and tips were set to the respective clearances and spring pressures shown in the following Table 6. The applicators having no pressurizing mechanism were obtained by removing the pressurizing mechanism from the applicator shown in FIG. 1.

Test Method of Cap-Off Property:

The cap-off property was evaluated by a change in a volatilization amount of the solvent. That is, a liquid weight of an ink composition shown in the following Table 6 which was filled in the coating fluid reservoir was measured, and then it was left standing in a cap-off state at RT (25° C., 60%; hereinafter the same shall apply). A change (% by weight) of the weight of only the ink composition was measured again after 1, 3 and 6 months to evaluate a cap-off property according to the following evaluation criteria.

Evaluation Criteria:

: reduction rate is 0 to 1% by weight

○: reduction rate is 1 to 4% by weight

Δ: reduction rate is 4 to 8% by weight

X: reduction rate is 8% by weight or more

Test Method of Coating Property:

A coating fluid reservoir was filled with an ink composition, and then the applicator was once used for coating the ink composition. Then, it was left standing in a cap-off state at RT, and coating was carried out again after 1, 3 and 6 months to evaluate a coating property according to the following evaluation criteria. In respect to the character size, word processor characters having a font size of 10.5 were used.

Evaluation Criteria:

: could be coated before one character or less was finished

○: could be coated before 5 characters or less was finished

Δ: could be coated after 5 characters or more were finished

X: could not be coated even after 20 characters or more were finished

TABLE 5

|  | Fluid coating liquid | | | | | | | | |
| --- | --- | --- | --- | --- | --- | --- | --- | --- | --- |
|  | 1 | 2 | 3 | 4 | 5 | 6 | 7 | 8 | 9 |
| Titanium oxide*1 | 42 | 42 |  | 42 | 32 | 35 | 35 | 42 | 35 | 35 |
| Hollow particle*2 |  |  |  |  | 10 |  |  |  |  |
| Resins: |  |  |  |  |  |  |  |  |  |
| Acryl synthetic resin B1 (resin content of 40% by wt. in solution) | 30 |  | 30 | 30 |  |  |  | 23 |  |
| Acryl synthetic resin B2 (resin content of 40% by wt. in solution) |  | 30 |  |  |  |  |  |  |  |
| Maleic acid resin*3 |  |  |  |  |  | 15 |  | 24 | 15 |
| Maleic acid resin*4 |  |  |  |  |  |  | 15 |  |  |
| Organic solvents: |  |  |  |  |  |  |  |  |  |
| Methylcyclohexane | 28 | 28 |  | 25 | 27 |  |  | 35 | 36 |
| Xylene |  |  |  |  |  | 45 | 45 |  |  |
| N,N-dimethylformamide |  |  |  |  |  |  |  |  | 45 |
| Additives: |  |  |  |  |  |  |  |  |  |
| GP-1*5 |  |  | 3 |  |  |  |  |  |  |
| Trimethylsiloxy silicate |  |  |  | 1 |  |  |  |  |  |
| Dispersant*6 |  |  |  |  | 5 | 5 |  | 5 | 5 |
| Viscosity (mPa · s) |  |  |  |  |  |  |  |  |  |
| Shearing rate (5 s$^{-1}$) | 70 | 75 | 1800 | 80 | 15 | 16 | 60 | 25 | 30 |
| Shearing rate (400 s$^{-1}$) | 65 | 70 | 130 | 70 | 14 | 15 | 55 | 20 | 25 |

*1: KR-380N (manufactured by Titan Kogyo Co., Ltd.)

*2: SX866 (manufactured by JSR Corporation)

*3: Malkyd No. 5 (manufactured by Arakawa Chemical Industries Ltd.), Tg: 90 to 100° C.

*4: Malkyd 3002 (manufactured by Arakawa Chemical Industries Ltd.), Tg: 115 to 135° C.

*5: N-lauroyl-L-glutamic acid-α, γ-di-n-butylamide (manufactured by Ajinomoto Co., Inc.)

*6: Beckosol ODE230-70 (manufactured by Dainippon Ink & Chemicals Inc.)

TABLE 6

|  |  | Example | | | | | | | | | | | | | | | | | | | | Comparative Example | | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
|  |  | 15 | 16 | 17 | 18 | 19 | 20 | 21 | 22 | 23 | 24 | 25 | 26 | 27 | 28 | 29 | 30 | 31 | 32 | 33 | 34 | 7 | 8 | 9 | 10 | 11 | 12 | 13 | 14 |
| Coating fluid | 1 | ☆ | ☆ | ☆ | ☆ | ☆ | ☆ | ☆ | ☆ | ☆ | ☆ | ☆ | ☆ | ☆ | ☆ |  |  |  |  |  |  | ☆ | ☆ |  |  |  |  |  |  |
|  | 2 |  |  |  |  |  |  |  |  |  |  |  |  |  |  |  |  |  |  | ☆ |  |  |  |  |  |  |  |  |  |
|  | 3 |  |  |  |  |  |  |  |  |  |  |  |  |  |  |  | ☆ |  |  |  |  |  |  |  |  |  |  |  |  |

TABLE 6-continued

| | | Example | | | | | | | | | | | | | | | | | | | | Comparative Example | | | | | | | |
|---|---|---|---|---|---|---|---|---|---|---|---|---|---|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 | 29 | 30 | 31 | 32 | 33 | 34 | 7 | 8 | 9 | 10 | 11 | 12 | 13 | 14 |
| | 4 | | | | | | | | | | | | | | | | ☆ | | | | | | | | | | | | |
| | 5 | | | | | | | | | | | | | | | | | ☆ | ☆ | ☆ | | | | | | ☆ | ☆ | | |
| | 6 | | | | | | | | | | | | | | | | | | | | | | | | | | | ☆ | |
| | 7 | | | | | | | | | | | | | | | | | | | | | | | | | | | | ☆ | |
| | 8 | | | | | | | | | | | | | | | | | | | | | | | | | | | | | ☆ |
| | 9 | | | | | | | | | | | | | | | | | | | | | | | | | | | | | ☆ |
| Tip clearance (mm) | 0.03 | | | | | | | | | | | | | | | | | | | | | ☆ | | ☆ | | | | | | |
| | 0.06 | ☆ | | | | | | | ☆ | | | ☆ | ☆ | ☆ | ☆ | | | | ☆ | ☆ | ☆ | | | | | | | | | |
| | 0.1 | | ☆ | | ☆ | ☆ | ☆ | ☆ | | ☆ | | | | | | ☆ | ☆ | ☆ | | | | | | | | | ☆ | ☆ | ☆ | ☆ |
| | 0.18 | | | ☆ | | | | | | | ☆ | | | | | | | | | | | | | | | | | | | |
| | 0.22 | | | | | | | | | | | | | | | | | | | | | | | ☆ | | ☆ | | | | |
| Spring pressure (N) | 0.1 | | | | ☆ | | | | ☆ | ☆ | ☆ | | | | | | | | | | | | | | | | | | | |
| | 0.25 | | | | | ☆ | | | | | | | ☆ | | | | | | | | | | | | | | | | | |
| | 0.8 | ☆ | ☆ | ☆ | | | | | | | | ☆ | | ☆ | ☆ | ☆ | ☆ | ☆ | ☆ | ☆ | ☆ | ☆ | ☆ | ☆ | ☆ | ☆ | ☆ | ☆ | ☆ | ☆ |
| | 1.3 | | | | | | ☆ | | | | | | | ☆ | | | | | | | | | | | | | | | | |
| | 1.6 | | | | | | | ☆ | | | | | | | ☆ | | | | | | | | | | | | | | | |
| Pressurizing mechanism (mm Hg) | Present (70) | ☆ | ☆ | ☆ | ☆ | ☆ | ☆ | ☆ | | | | | | | ☆ | ☆ | ☆ | | | | | ☆ | ☆ | | | ☆ | ☆ | ☆ | ☆ |
| | Absent (0) | | | | | | | | ☆ | ☆ | ☆ | ☆ | ☆ | ☆ | | | | ☆ | ☆ | ☆ | | | | ☆ | ☆ | | | | | |
| Cap-off property | RT 1 month | ◉ | ◉ | ◉ | ○ | ○ | ◉ | ◉ | ○ | ◉ | ◉ | ◉ | ◉ | ◉ | ◉ | ◉ | ◉ | ◉ | ◉ | ◉ | ◉ | ○ | ◉ | ○ | ◉ | ◉ | ○ | ◉ | ○ |
| | RT 3 months | ◉ | ◉ | ◉ | ○ | ◉ | ◉ | ◉ | ○ | ◉ | ◉ | ○ | ◉ | ○ | ◉ | ◉ | ◉ | ◉ | ◉ | ◉ | ◉ | △ | ◉ | △ | ◉ | ◉ | △ | ◉ | ○ |
| | RT 6 months | ◉ | ◉ | ◉ | ○ | ◉ | ◉ | ◉ | ○ | ○ | ○ | ○ | ○ | ○ | ○ | ○ | ◉ | ◉ | ◉ | ○ ○ | ○ | △ | ◉ | △ | ◉ | ◉ | X | ◉ | △ |
| Coating property | RT 1 month | ◉ | ◉ | ◉ | ◉ | ◉ | ◉ | ◉ | ○ | ◉ | ◉ | ○ | ○ | ○ | ○ | ◉ | ◉ | ◉ | ○ | ○ | ○ | △ | △ | △ | △ | ○ | ○ | △ | △ |
| | RT 3 months | ◉ | ◉ | ◉ | ◉ | ◉ | ◉ | ◉ | ○ | ◉ | ○ | ○ | ○ | ○ | ○ | ◉ | ◉ | ◉ | ○ | ○ | ○ | △ | X | △ | X | △ | △ | △ | X |
| | RT 6 months | ◉ | ◉ | ◉ | ○ | ◉ | ◉ | ○ | ○ | ○ | ○ | ○ | ○ | ○ | ○ | ◉ | ◉ | ◉ | ○ | ○ | ○ | X | X | X | X | X | X | X | X |

As apparent from the results shown in Table 5 to Table 6 described above, it has been found that in Examples 15 to 34 falling in the scope of the second invention as compared with Comparative Examples 7 to 14 falling outside the scope of the second invention, the applicators are excellent in a cap-off property even after left in a cap-off state over a long period of time and excellent as well in a coating property.

To specifically observe Comparative Examples 7 to 14, Comparative Examples 7 to 10 are cases in which the coating fluids fall in the scope of the present invention but a moving distance of the ball toward a rear falls outside of the scope of the present invention of 0.06 to 0.2 mm; Comparative Example 11 is a case in which the resin (Tg) falls outside the scope of the present invention; Comparative Examples 12 and 13 are cases in which a content of the resin falls outside the scope of the present invention; and Comparative Example 14 is a case in which the solvent falls outside the scope of the present invention. It has become clear that the effects of the present invention can not be exhibited in the above cases.

Examples 35 to 39 and Comparative Examples 15 to 17

Second Invention

A coating liquid reservoir having the following structure was sealed by the respective methods on a tip point part with a resin coating film using resin coating film materials having the respective components shown below.

The fluid applicators thus obtained in which a tip point part was sealed were used for measuring pulling strength and evaluating a writing property by the following methods. The results thereof are shown in the following Table 7.

Structure of Fluid Applicators:

A reservoir constituted from nylon 12, which is equipped with a ballpoint pen type stainless-made pen point (ball material: hard metal, ball diameter: 1.0 mm) as a flow-inhibiting mechanism and has an inner diameter of 6 mm, an outer diameter of 8 mm, a thickness of 1 mm and a length of 80 mm, was charged with about 1.5 g of a correction liquid which was a fluid having a formulation and a viscosity each shown below. Then, 0.5 g of a follower having a formulation and a viscosity each shown below was put on an end part of the above fluid so that it was disposed in a contact state therewith to obtain the respective fluid applicators.

Shown in the following Table 7 are the form of a resin coating film H, a maximum thickness (D1) of a seal on a ball part and a minimum thickness (D2) of the seal on a tip part with respect to the resin coating film H in a ballpoint pen tip point part.

| Formulation of fluid: | |
|---|---|
| Methyl cyclohexane | 40 parts |
| Acryl resin | 10 parts |
| Titanium oxide | 49 parts |
| Powder silica | 1 part |

| Formulation of follower: | |
|---|---|
| Ethylene oxide 13 mole adduct of diglycerin | 95 parts |
| Fine powder silica | 5 parts |

A viscosity of the above correction liquid was measured by means of a viscometer (manufactured by Toki Sangyo Co., Ltd.) to find that it was 5000 mP·s at 1 rpm, and the follower had a viscosity (25° C.) of 10,000 mP·s at 1 rpm.

Example 35

Tohmide 394 (softening point: 110° C.) was molten by heating at temperature exceeding the softening point to put a resin coating film on the tip point part.

Example 36

Tohmide 535 (softening point: 135° C.) was molten by heating at temperature exceeding the softening point to put a resin coating film on the tip point part.

Example 37

Tohmide 558 (softening point: 160° C.) was molten by heating at temperature exceeding the softening point to put a resin coating film on the tip point part.

Example 38

Tohmide 1350 (softening point: 152° C.) was molten by heating at temperature exceeding the softening point to put a resin coating film on the tip point part.

Example 39

Tohmide 1360 (softening point: 170° C.) was molten by heating at temperature exceeding the softening point to put a resin coating film on the tip point part.

Comparative Example 15

A fluid applicator having no resin coating film was used as it was.

Comparative Example 16

Polyamide Q9692 (manufactured by Henkel Japan, Ltd.) was molten by heating to put a resin coating film on the tip point part.

Comparative Example 17

Polyolefin Q9301 (manufactured by Henkel Japan, Ltd.) was molten by heating to put a resin coating film on the tip point part.

Measuring Method of Pulling Strength

A push pull testing machine (push pull scale: 10N, manufactured by Imada Co., Ltd.) was used to measure the pulling strength under the condition of 25° C. and 60% RH.

Evaluating Method of Writing Property

The fluid applicators obtained in Examples 35 to 39 and Comparative Examples 15 to 17 were left standing in a constant temperature bath of 50° C. for 2 weeks, and then the respective resin coating films were peeled with fingers to evaluate a starting state in writing according to the following evaluation criteria (sample number: each 10).

Evaluation Criteria:

⊙: wholly writable from the beginning

○: a little slow in starting of writing but writable soon

Δ: starving is caused in a certain case

X: unwritable applicators are present

TABLE 7

Figure 8:
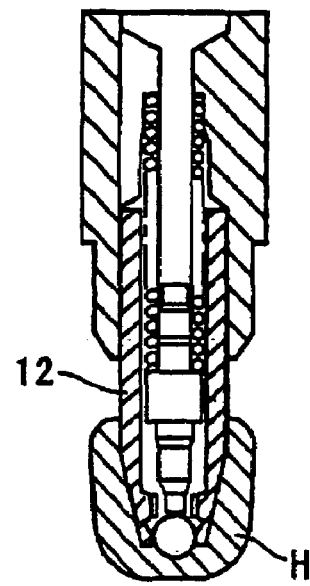
FIG. 8 is a partial vertical cross-sectional drawing showing one example of a cross-sectional shape of a resin coating film H.
Figure 9:
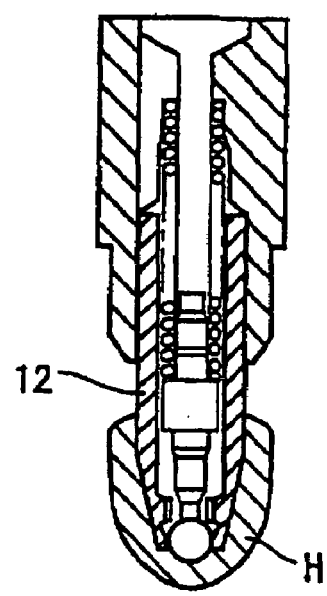
FIG. 9 is a partial vertical cross-sectional drawing showing another example of a cross-sectional shape of the resin coating film H.
Figure 10:
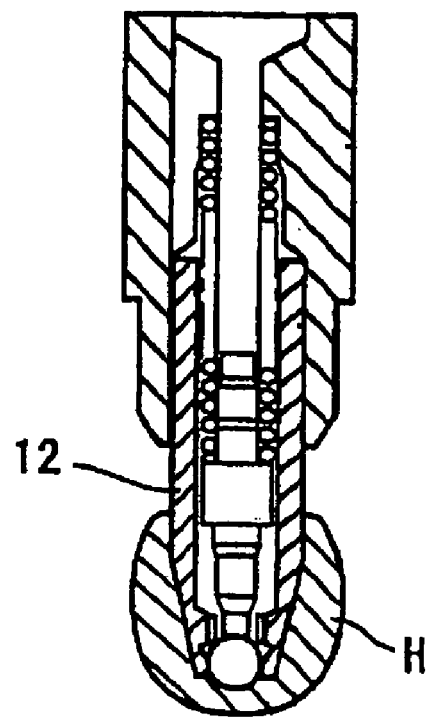
FIG. 10 is a partial vertical cross-sectional drawing showing another example of a cross-sectional shape of the resin coating film H.

| | Example | | | | | Comparative Example | | |
|---|---|---|---|---|---|---|---|---|
| | 35 | 36 | 37 | 38 | 39 | 15 | 16 | 17 |
| Resin coating film form (FIG. 8 to FIG. 10) | FIG. 8 | FIG. 9 | FIG. 10 | FIG. 10 | FIG. 10 | — | FIG. 10 | FIG. 10 |
| Thickness of D1 and D2 | D1<D2 | D1<D2 | D1>D2 | D1>D2 | D1>D2 | — | D1<D2 | D1<D2 |
| Peeling strength (N) | 3.8 | 5.1 | 6.7 | 7.1 | 7.9 | — | 0.3 | 0.7 |
| Writing property | ⊙ | ⊙ | ⊙ | ⊙ | ⊙ | X | Δ | Δ |

As apparent from the results shown in Table 7 described above, it has been found that in Examples 35 to 39 falling in the scope of the present invention as compared with Comparative Examples 15 to 17 falling outside the scope of the present invention, the resin coating films can readily be peeled and that the writing properties are excellent as well.

INDUSTRIAL APPLICABILITY

In the present invention, titanium oxide can be inhibited from settling down over a long period of time, and fluidity and a leveling property of the coating fluids including an ink composition and the like can be secured; the coating fluid can discharge well from a point immediately after starting use without causing dry-up even after exposed to the air over a long period of time; and a solvent having high volatility can surely be inhibited from volatilizing from a tip point, and a tip point part can surely be protected. Accordingly, it can suitably be applied to writing instruments including felt-tip pens and ballpoint pens, correction devices, adhesive applicators and toilet tools.

What is claimed is:

1. A coating fluid characterized by that in an ink composition comprising at least titanium oxide, a resin and an organic solvent, an additive comprising an N-acylamino acid derivative whose fundamental frame is at least one selected from N-acylamino acid amides and N-acylamino acid esters is added in an amount of 0.6 to 4.5% by weight based on the total amount of the ink composition and that a content of the resin described above is 1.5 to 11 parts by weight based on a content of 1 part by weight of the additive described above.

2. The coating fluid as described in claim 1, wherein the additive described above is N-lauroyl-L-glutamic acid-α, γ-di-n-butylamide.

3. The coating fluid as described in claim 1, wherein the resin described above is an acryl base resin and has a number average molecular weight of 10000 to 200000.

4. The coating fluid as described in claim 3, wherein the acryl base resin described above is an acryl base synthetic resin which is obtained by copolymerizing monomers comprising a (meth)acrylic acid ester represented by the following Formula (I) in a range of 93 to 99% by weight and a basic nitrogen-containing monomer represented by the following Formula (II) in a range of 0.4% by weight or more or more and less than 2% by weight:

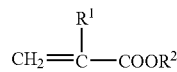
(I)

[in Formula (I) described above, $R^1$ represents a hydrogen atom or a methyl group, and $R^2$ represents a linear or branched hydrocarbon group having 1 to 18 carbon atoms or a hydrocarbon group having a naphthene ring or an aromatic ring];

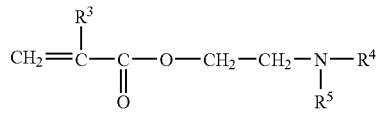
(II)

[in Formula (II) described above, $R^3$ represents a hydrogen atom or a methyl group, and $R^4$ and $R^5$ each represent independently a methyl or ethyl group].

5. A fluid applicator which is equipped with a ballpoint pen tip at a point and an ink reservoir at a rear and in which a spring pressure is applied onto a back face of a point ball so that the point ball is brought into tight contact with an inner edge of a ball holding part at a point of the tip, wherein the ink reservoir described above is filled with the coating fluid as described in claim 1.

6. A coating fluid used for a fluid applicator which is equipped with a ballpoint pen tip at a point and a coating fluid reservoir for storing the coating fluid at a rear, the tip of which comprises a tip main body having a ball receiving chamber for allowing the coating fluid to flow in and having a front end aperture part for discharging the coating fluid at a point part of the ball receiving chamber, a ball received in the ball receiving chamber in the above tip main body, partially protruding from the front end aperture part described above and airtightly closing the aperture part, a spring applying pressure on the back face of the above ball to support it from a rear and a ball receiving seat controlling a moving distance of the ball toward a rear and in which the moving distance of the ball toward the rear is 0.06 to 0.2 mm, wherein the above coating fluid comprises at least titanium oxide, a resin and an organic solvent; the organic solvent comprises an organic solvent which has a vapor pressure of 1 mm Hg or more at 20° C. and a low polarity corresponding to a solubility parameter δ of 10 or less and which has relatively high volatility; and the resin has a glass transition temperature (Tg) of 100° C. or lower and is contained in an amount of 9.7 to 22% by weight based on the total amount of the coating fluid.

7. The coating fluid as described in claim 6, wherein the resin is an acryl base resin, and it is an acryl base synthetic resin which is obtained by copolymerizing monomers comprising a (meth)acrylic acid ester represented by the following Formula (I) in a range of 93 to 99% by weight and a basic nitrogen-containing monomer represented by the following Formula (II) in a range of 0.4% by weight or more and less than 2% by weight:

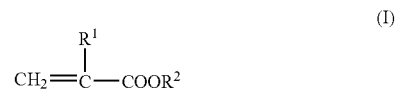
(I)

[in Formula (I) described above, $R^1$ represents a hydrogen atom or a methyl group, and $R^2$ represents a linear or branched hydrocarbon group having 1 to 18 carbon atoms or a hydrocarbon group having a naphthene ring or an aromatic ring];

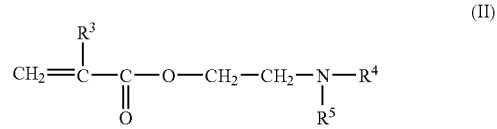
(II)

[in Formula (II) described above, $R^3$ represents a hydrogen atom or a methyl group, and $R^4$ and $R^5$ each represent independently a methyl or ethyl group].

8. A fluid applicator which is equipped with a ballpoint pen tip at a point and a coating fluid reservoir for storing a coating fluid at a rear, the tip of which comprises a tip main body having a ball receiving chamber for allowing the coating fluid to flow in and having a front end aperture part for discharging the coating fluid at a point part of the ball receiving chamber, a ball received in the ball receiving chamber in the above tip main body, partially protruding from the front end aperture part described above and airtightly closing the aperture part, a spring applying pressure on the back face of the above ball to support the ball from a rear and a ball receiving seat controlling a moving distance of the ball toward a rear and in which the moving distance of the ball toward the rear is 0.06 to 0.2 mm, wherein the above coating fluid comprises at least titanium oxide, a resin and an organic solvent; the organic solvent comprises an organic solvent which has a vapor pressure of 1 mm Hg or more at 20° C. and a low polarity corresponding to a solubility parameter δ of 10 or less and which has relatively high volatility; and the resin has a glass transition temperature (Tg) of 100° C. or lower and is contained in an amount of 9.7 to 22% by weight based on the total amount of the coating fluid.

9. The fluid applicator as described in claim 8, wherein a load of the spring pressing the point ball which is applied on the back face of the point ball is 0.1 to 1.5N.

10. The fluid applicator as described in claim 8, wherein the coating fluid reservoir main body or the rear thereof is equipped with a pressing means or a pressurizing mechanism so that the coating fluid filled in the coating fluid reservoir can be pressurized and coated.

11. The fluid applicator as described in claim 9, wherein the coating fluid reservoir main body or the rear thereof is equipped with a pressing means or a pressurizing mechanism so that the coating fluid filled in the coating fluid reservoir can be pressurized and coated.

12. A fluid applicator which is equipped with a coating fluid reservoir mounted in a barrel main body, in which the coating fluid reservoir is filled with a coating fluid containing at least an organic solvent selected from the following A group and a colorant and having a shearing thinning property, which is equipped with a ballpoint pen tip having a discharge-controlling mechanism at a point and in which a point part of the above tip is sealed with a resin coating film formed from a hot melt adhesive, wherein the resin coating film is a coating film formed from polymerized fatty acid-modified polyamide represented by the following Formula (III), and the above coating film has a pulling strength of 1 to 10N under the condition of 25° C. and 60 RH % measured by means of a push-pull tester;

A group: n-hexane, n-heptane, n-octane, isooctane, cyclohexane, methylcyclohexane, ethylcyclohexane, toluene and xylene:

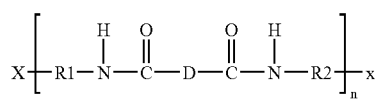

(III)

[in Formula (III) described above, D is a dimer acid frame;
X is a terminal group such as —COOH, —NH$_2$ and —H;
R1 and R2 are amine frames; and n is a positive number].

13. The fluid applicator as described in claim 12, wherein the resin coating film is formed so that D1<D2 is achieved in a thickness of a part sealed by the resin coating film at a point part of the ballpoint pen tip, wherein D1 is a maximum thickness of the coating film seal on the ball part, and D2 is a minimum thickness of the seal on the tip part.

14. The fluid applicator as described in claim 12, wherein the shape of the seal formed from the resin coating film is any one of a droplet form, a reverse hanging bell form and a conical form.

15. The fluid applicator as described in claim 13, wherein the shape of the seal formed from the resin coating film is any one of a droplet form, a reverse hanging bell form and a conical form.

16. The fluid applicator as described in claim 12, wherein it is a capless type of a knock type in which a ballpoint pen tip point part constituting a pen tip can be come out and in interlocking with a push-out operation and a releasing operation of a knock mechanism provided at a rear end of the barrel main body.

17. The fluid applicator as described in claim 12, wherein the fluid reservoir is receivable in the barrel main body having a pressuring mechanism.

* * * * *